US009354445B1

(12) United States Patent
Weaver et al.

(10) Patent No.: US 9,354,445 B1
(45) Date of Patent: May 31, 2016

(54) INFORMATION PROCESSING ON A HEAD-MOUNTABLE DEVICE

(75) Inventors: Joshua Weaver, San Jose, CA (US); Thad Eugene Starner, Mountain View, CA (US); Cliff L. Biffle, Berkeley, CA (US); Edward Allen Keyes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 800 days.

(21) Appl. No.: 13/601,900

(22) Filed: Aug. 31, 2012

Related U.S. Application Data

(60) Provisional application No. 61/584,152, filed on Jan. 6, 2012.

(51) Int. Cl.
*G02B 27/00* (2006.01)
*G02B 27/01* (2006.01)
*A61B 3/113* (2006.01)

(52) U.S. Cl.
CPC .......... *G02B 27/0093* (2013.01); *G02B 27/01* (2013.01)

(58) Field of Classification Search
CPC ............... A61B 3/113; G02B 27/0093; G02B 27/0187; G06K 9/00597; G06F 3/013
USPC .................................. 702/104; 351/209, 210
See application file for complete search history.

(56) References Cited

U.S. PATENT DOCUMENTS

| | | | |
|---|---|---|---|
| 5,689,619 A | 11/1997 | Smyth | |
| 6,396,497 B1 | 5/2002 | Reichlen | |
| 7,401,920 B1 * | 7/2008 | Kranz et al. | 351/210 |

(Continued)

FOREIGN PATENT DOCUMENTS

| | | |
|---|---|---|
| DE | 10100017 A1 | 8/2002 |
| EP | 903661 A1 | 1/2003 |

(Continued)

OTHER PUBLICATIONS

Westeyn. Tracy, et al., Biometric Identification Using Song-Based Blink Patterns, Georgia Institute of Technology, available at http://citeseerx.ist.psu.edulviewdoc/download?doi=10.1.1.85.4472&rep=rep1&type=pdf (last visited on Sep. 15, 2011).

(Continued)

*Primary Examiner* — Michael Nghiem
*Assistant Examiner* — Peter Ngo
(74) *Attorney, Agent, or Firm* — McDonnell Boehnen Hulbert & Berghoff LLP

(57) ABSTRACT

Example methods and systems determine a position of a portion of a human eye based on electromagnetic radiation reflected from the surface of the human eye. A sensor associated with a computing device can be calibrated in response to an event. The computing device can receive data indicative of electromagnetic radiation reflected from a human eye. The computing device can determine a position of a portion of the human eye based on the received data indicative of electromagnetic radiation. The computing device can generate an indication including the position of the portion of the human eye. The computing device can transmit the indication from the computing device. In some embodiments, the data indicative of electromagnetic information can be provided by electromagnetic emitter/sensors mounted on a wearable computing device directed toward a human eye of a wearer of the wearable computing device.

18 Claims, 10 Drawing Sheets

(56) References Cited

U.S. PATENT DOCUMENTS

| | | | |
|---|---|---|---|
| 7,479,949 | B2 | 1/2009 | Jobs et al. |
| 2001/0043402 | A1 | 11/2001 | Melville et al. |
| 2006/0115130 | A1 | 6/2006 | Kozlay |
| 2006/0253793 | A1 | 11/2006 | Zhai et al. |
| 2008/0122796 | A1 | 5/2008 | Jobs et al. |
| 2009/0058660 | A1 | 3/2009 | Torch |
| 2011/0077548 | A1* | 3/2011 | Torch ............................ 600/558 |
| 2011/0273722 | A1* | 11/2011 | Charny ................... G01S 3/784 356/614 |

FOREIGN PATENT DOCUMENTS

| | | |
|---|---|---|
| EP | 2202609 A2 | 6/2010 |
| JP | 2001154794 | 8/2001 |
| WO | 2004084054 | 9/2004 |

OTHER PUBLICATIONS

Westeyn, Tracy, et al., Recognizing Song-Based Blink Patterns: Applications for Restricted and Universal Access, Georgia Institute of Technology, available at http://www-static.cc.gatech.edu/faclThad.Starner/ D p/031_30_Gesture/westeynJG2004.pdf (last visited on Sep. 15, 2011).

Lin, Chern-Sheng, et al., A Novel Device for Head Gesture Measurement System in Combination with Eye-Controlled Human-Machine Interface, Optics and Lasers in Engineering, Jun. 2006, pp. 597-614, vol. 44, Issue 6.

Lin, Chern-Sheng, et al., A New Image Processing Method for Evaluating the Pupillary Responses in a HMD-Type Eye-Tracking Device, Optics and Lasers Technology, 2003, vol. 35, pp. 505-515.

Yeh, Chin-Yen, Image-Based Human Computer Interfaces for People with Severe Disabilities, available at: http://thesis.lib.ncu.edu.tw/ETD-db/ETD-searchlview_etd?URN=955202006#anchor (last visited Sep. 15, 2011).

Arai, Kohei, et al., Real Time Blinking Detection Based on Gabor Filter, International Journal of Human Computer Interaction, available at http://www.cscjournals.org/csc/manuscriptlJournals/IJIP/Finalversion/Camera_readLIJHCI-11.pdf (last visited on Sep. 15, 2011).

Grauman, K, et al., Communication Via Eye Blinks and Eyebrow Raises: Video-Based Human-Computer Interfaces, available at http://cstest.bc.edu/-gips/eyeblink.pdf (last visited Sep. 15, 2011).

Ishiguro, Yoshio, et al., Aided Eyes: Eye Activity Sensing for Daily Life, Proceedings of the 1st Augmented Human International Conference, 2010, available at http://portal.acm.org/citation.cfm?id=1785480 (last visited Sep. 15, 2011).

Fairclough, Stephen H., Physiological Computing: Interfacing with the Human Nervous System, available at http://web.mac.com/shfairclough/Stephen_Fairclough_Research/ Publications_physiological_computing_mental_effort_stephen_fairclough_files/probing_experience_sf.pdf (last visited Sep. 16, 2011).

Mulgund, Sandeep S., et al., A Situation-Driven Adaptive PilotlVehicle Interface, available at http://citeseerx.ist.psu.edulviewdoc/download?doi=1 0.1.1.40.2831 &rep=rep1 &type=pdf (last visited Sep. 16, 2011).

Cho, Hyun Sang, Development of Brain Computer Interface for VR-based Ubiquitous Environment Control System, available at http://web.kaist.ac.kr/-haemosu/papersl7.pdf (last visited Sep. 16, 2011).

Caldwell. Tracey. Syntec Optics and Eye-Com Combine Eye Tracking with Head Movement Technology, Biometric Technology Today, Mar. 2011, p. 2.

NeuroSky Developer Tools 2.1 Supports Eye Blink Detection, pp. 1-100, available at http://gadgelfanboy.com!general!neurosky-developer-tools-21-supports-eye-blink-detection! (last visited Jul. 8, 2011).

NeuroSky Developer Tools 2.1 Supports Eye Blink Detection, pp. 101-284, available at http://gadgelfanboy.com! general! neurosky-developer-tools-21-supports-eye-blink-detection! (last visited Jul. 8, 2011).

Graupner, S.T. et al, "Evaluating requirements for gaze-based interaction in a see-through head mounted display", Mar. 26-28, 2008, Proceedings of the 2008 Symposium of Eye Tracking Research and Applications, pp. 91-94, ACM, Savannah, GA.

Yoo, D.H. et al, "Non-intrusive Eye Gaze Estimation without Knowledge of Eye Pose", May 17-19, 2004, Proceedings of the Sixth IEEE Conference on Automatic Face and Gesture Recognition, pp. 785-790, IEEE.

Reulen, J.P. et al, "Precise Recording of Eye Movement: the IRIS Technique. Part 1.", Medical & Biological Engineering and Computing, Jan. 1988, p. 20, vol. 26, issue 1, IFMBE.

Ryan et al, "A long-range, wide field-of-view infrared eyeblink detector", Journal of Neuroscience Methods, May 2006,pp. 74-82, vol. 152, Issues 1-2, Elsevier B.V.

Topal C. et al,"A Head-Mounted Sensor-Based Eye Tracking Device: Eye Touch System", Mar. 26-28, 2008, Proceedings of the 2008 Symposium of Eye Tracking Research and Applications, pp. 87-90, ACM, Savannah, GA.

* cited by examiner

INFORMATION PROCESSING ON A HEAD-MOUNTABLE DEVICE

CROSS-REFERENCE TO RELATED APPLICATIONS

This application claims priority to U.S. Pat. App. No. 61/584,152, filed Jan. 6, 2012, entitled "Methods for Eye-Tracking on a Head Mountable Display", now pending, the contents of which are incorporated by reference herein for all purposes.

This application is related to U.S. patent application Ser. No. 13/235,201, filed Sep. 16, 2011, entitled "Wearable Computing System with Eye-Movement Unlock", now pending.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an example computer-implemented method can include: (a) in response to an event, calibrating a sensor associated with a computing device, (b) receiving data indicative of electromagnetic radiation reflected from a human eye at the sensor associated with the computing device, (c) determining a position of a portion of the human eye based on the received data indicative of electromagnetic radiation using the computing device, (d) generating an indication including the position of the portion of the human eye using the computing device, and (e) transmitting the indication from the computing device.

In another aspect, an example computing device can include a processor, one or more electromagnetic-radiation emitter/sensors, a non-transitory computer-readable medium and program instructions stored on the non-transitory computer-readable medium. The program instructions can be executable by the processor to cause the wearable computing device to perform functions. The functions can include: (a) in response to an event, calibrating at least one electromagnetic-radiation emitter/sensor of the one or more electromagnetic-radiation emitter/sensors, (b) receiving data indicative of electromagnetic radiation reflected from a human eye at the at least one electromagnetic-radiation emitter/sensor, (c) determining a position of a portion of the human eye based on the received data indicative of electromagnetic radiation, (d) generating an indication including the position of the portion of the human eye, and (e) transmitting the indication.

In yet another aspect, an article of manufacture can a non-transitory computer-readable medium having instructions stored thereon that, if the instructions are executed by a computing device, can cause the computing device to perform functions. The functions can include: (a) in response to an event, calibrating a sensor, (b) receiving data indicative of electromagnetic radiation reflected from a human eye from the sensor, (c) determining a position of a portion of the human eye based on the received data indicative of electromagnetic radiation, (d) generating an indication including the position of the portion of the human eye, and (e) transmitting the indication.

These as well as other aspects, advantages, and alternatives, will become apparent to those of ordinary skill in the art by reading the following detailed description, with reference where appropriate to the accompanying drawings.

DETAILED DESCRIPTION

Figure 1:
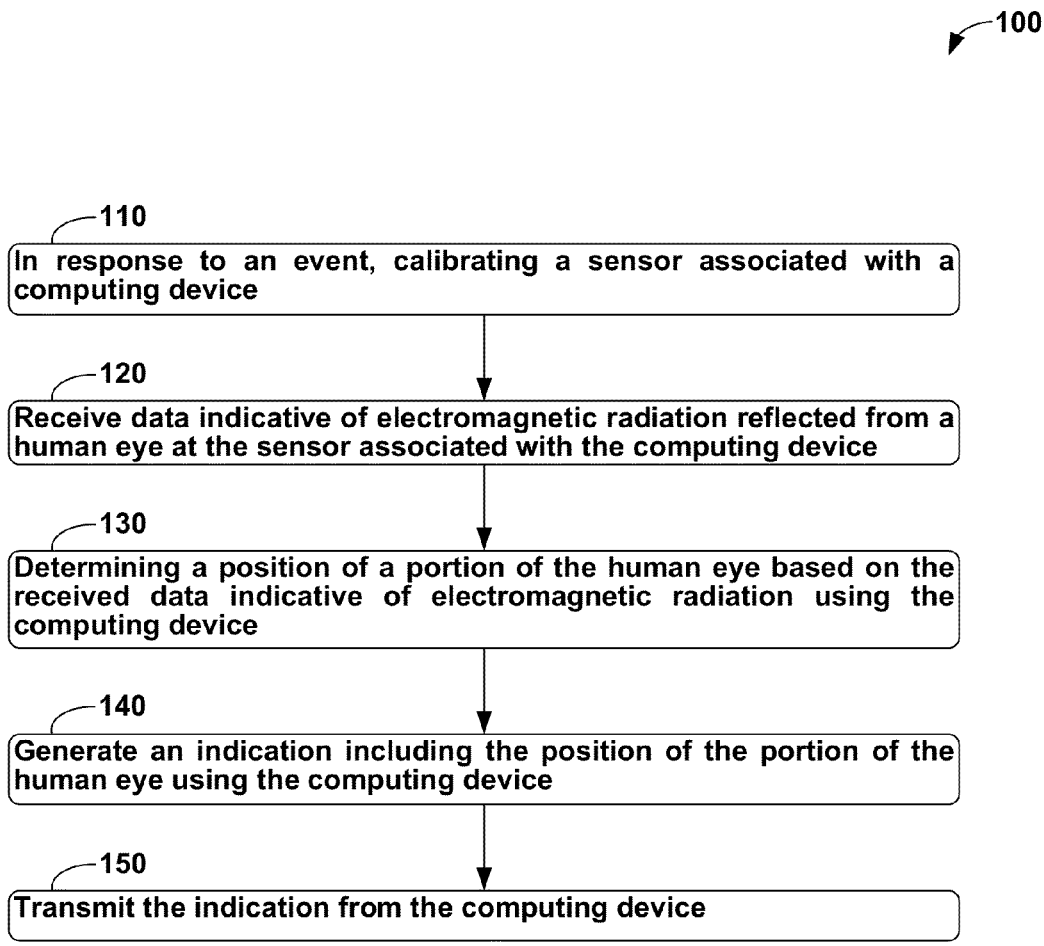
FIG. 1 is a flow chart illustrating a method, according to an example embodiment.

Example methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

INTRODUCTION

Example systems and methods may be implemented in the context of a wearable computer with a head-mounted display (HMD). In particular, example systems and methods involve determining a position of an eye using one or more "electromagnetic emitter/sensors" (EESs). The one or more electromagnetic emitter/sensors can be placed on the head mountable display and configured to emit and detect electromagnetic radiation, a.k.a. light, directed at an eye of a wearer of the head mountable display.

The head wearable display can be configured with electromagnetic emitter/sensors for one or both eyes. The electromagnetic emitter/sensors can then emit electromagnetic radiation toward one or both eyes of the wearer and receive indications of received electromagnetic radiation from one or both eyes of the wearer.

After the electromagnetic radiation reflects off of the eye(s), each of the electromagnetic emitter/sensors can sense or detect the reflected electromagnetic radiation. Upon detecting the reflected electromagnetic radiation, each electromagnetic emitter/sensor can determine an amount of received electromagnetic radiation received and generate an indication of a position and/or amount of received electromagnetic radiation. Each sensor can provide the indications to a computing device, perhaps associated with the head-mountable display.

In most cases, when the emitted electromagnetic radiation reaches an eye, some radiation will be absorbed and some radiation will be reflected. The reflected radiation can form a "glint" or region of relatively-high electromagnetic radiation. When a sensor receives the reflected radiation for a glint, an indication of a position, size, area, and/or other data related to the glint can be provided. The position of a cornea, which covers the pupil and iris, can be determined based on glint patterns, or patterns of glints reflected from an eye from radiation emitted by multiple sensors at the same time.

Darker portions of the eye, such as the pupil and iris, tend to absorb more radiation than lighter portions of the eye, such as the sclera or white of the eye. As such, if multiple sensors emit electromagnetic radiation toward the eye at the same, or approximately the same time, the sensors that receive the least amount of reflected radiation correspond to sensors closest to the darker iris and pupil than to sensors closest to the lighter sclera. In scenarios where sensors are used on both eyes of a wearer, the indications from the two eyes can be combined to determine if both eyes are looking at a same object, are both closed, or are in different.

The computing device can review all of the indications and determine which indication(s) have the lowest amount(s) of received electromagnetic radiation. If an indication from one sensor associated with an eye has the lowest amount of received electromagnetic radiation, then the computing device can infer that the sensor is closest to the pupil and iris of the eye. In some cases, the position of the electromagnetic emitter/sensors can divide a portion of the head-mounted device, such as one lens, into sectors or other areas, where each sector can be associated with one or more electromagnetic emitter/sensors. After determining which sensor(s) is/are closest to the pupil and iris of the eye, then the computing device can assign the pupil and iris to be within one or more sectors associated with the closest sensor.

The computing device can then examine indications of received electromagnetic radiation from other sensors, such as neighbors to the closest sensor, to better estimate the position of the pupil and iris of the eye. For example, suppose two sensors have equal or approximately equal values of received electromagnetic radiation. Then, the computing device can infer that the position of the pupil and iris of the eye may be nearly equidistant from the two sensors. Once the computing device has determined the position of the pupil and iris of the eye, then the computing device can determine a gaze direction based on the position of the pupil and iris of the eye.

Other portions of the eye can be detected as well. For example, suppose all sensors receive approximately equal amounts of received electromagnetic radiation, and each amount is relatively low. The computing device can then infer the electromagnetic radiation is not being reflected from the eye, but perhaps from an eyelid. In this case, by inferring the electromagnetic radiation is reflected off of an eyelid, the computing device can infer that the eye is closed and that the wearer is either blinking or has shut their eyes.

Example Methods

FIG. 1 is a flow chart illustrating a method according to an example embodiment. Method 100 is described by way of example as being carried out by a computing device, such as one or more of the wearable computing devices described herein, but may be carried out by other devices or systems as well.

Method 100 may be implemented to determine a position of a portion of a human eye. Method 100 can begin at block 110.

At block 110, a sensor associated with the computing device can be calibrated in response to an event. In some embodiments, the event can include displaying imagery using the computing device. In other embodiments, calibrating the sensor can include: performing a process using the computing device. While performing the process, invoking a calibration process and, during the calibration process, calibrating the sensor. In particular embodiments, the process can include a process to lock or unlock the computing device.

At block 120, the sensor associated with the computing device can receive data indicative of electromagnetic radiation reflected from a human eye at the sensor associated with the computing device. The electromagnetic radiation, a.k.a. light, can be output by an electromagnetic emitter/sensor configured to emit light directed toward the human eye. Once the light is reflected from the eye, the electromagnetic emitter/sensor can detect the reflected light and generate data indicative of electromagnetic radiation reflected from a human eye. The electromagnetic emitter/sensor can provide the generated data indicative of electromagnetic radiation to the computing device. In some embodiments, the emitted light can be in a pre-determined frequency, such as an infrared frequency.

At block 130, the computing device can determine a position of a portion of the human eye based on the received data indicative of electromagnetic radiation. The portion of the human eye can include an iris, pupil, and/or eyelid. In some embodiments, a gaze direction of the human eye can be determined based on the position of the portion of the human eye. In other embodiments, the computing device can determine if the human eye is blinking based on the position of the portion of the human eye.

At block 140, the computing device can generate an indication that includes the position of the portion of the human eye.

At block 150, the computing device can transmit the indication.

Example Head Mountable Displays for Determining Pupil Positions

Figure 2A:
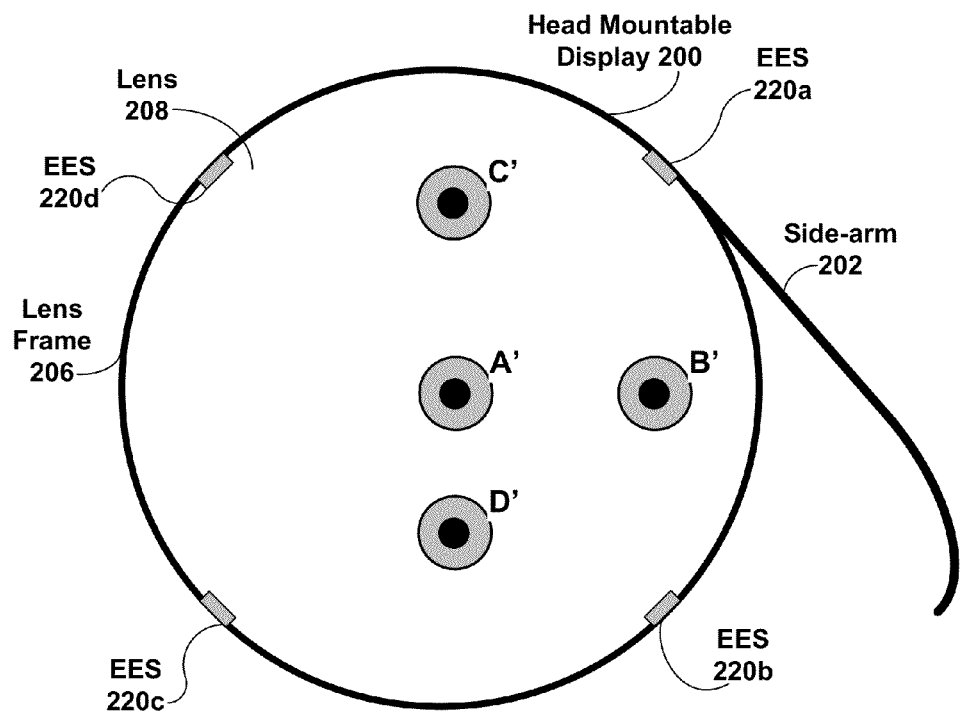
FIG. 2A is a block diagram illustrating a head mountable display configured to determine eye positions, according to an example embodiment.

FIG. 2A shows a right side of head mountable display 200 that includes side-arm 202, center-frame support 204, lens frame 206, lens 208, and electromagnetic emitter/sensors (EESs) 220a-220d. The center frame support 204 and extending side-arm 202, along with a left extending side-arm (not shown in FIG. 2A) can be configured to secure head-mounted device 200 to a wearer's face via a wearer's nose and ears, respectively. Lens frame 206 can be configured to hold lens 208 at a substantially uniform distance in front of an eye of the wearer.

Each of electromagnetic emitter/sensors 220a-220d can be configured to emit and/or sense electromagnetic radiation in one or more frequency ranges. In one example, each of electromagnetic emitter/sensors 220a-220d can be configured to emit and sense infrared light. The emitted electromagnetic radiation can be emitted at one or more specific frequencies or frequency ranges, such as an infrared frequency, to both aid detection and to distinguish the emitted radiation from background radiation, such as ambient light. In other embodiments, the emitted electromagnetic radiation can be emitted using a specific pattern of frequencies or frequency ranges to better distinguish emitted radiation from background radiation and to increase the likelihood of detection of the emitted radiation after reflection from the eye.

Electromagnetic emitter/sensors 220a-220d can be configured to emit electromagnetic radiation toward a right eye of a wearer of head mountable display 200 and subsequently detect reflected electromagnetic radiation to determine a position of a portion of the right eye of the wearer. For example, electromagnetic emitter/sensor 220a can be configured to emit and receive electromagnetic radiation at or near the upper-right-hand portion of the right eye of the wearer, while electromagnetic emitter/sensor 220c can be configured to emit and receive electromagnetic radiation at or near the lower-left-hand portion of the right eye of the wearer.

For example, suppose at a time $T_{A'}$ the iris and pupil of the right eye of the wearer were located at position A' shown in FIG. 2A; i.e., at the center of lens 208. At time $T_{A'}$, electromagnetic emitter/sensors 220a-220d can emit electromagnetic radiation toward the right eye and the emitted light can be reflected from the surface of the right eye. Shortly after $T_{A'}$, electromagnetic emitter/sensors 220a-220d can receive the reflected electromagnetic radiation as a "glint" and provide data about the reflected electromagnetic radiation to head mounted display 200 and/or other devices. For example, a sensor of electromagnetic emitter/sensors 220a-220d receives the reflected radiation for a glint, an indication of a position, size, area, and/or other data related to the glint can be generated and provided to head mounted display 200 and/or other devices.

A position of the glint can be determined relative to other glints received by electromagnetic emitter/sensors 220a-220d to determine a relative direction of an iris and/or pupil of an eye. The iris and pupil of a human eye are covered by the cornea, which is a transparent, dome-shaped structure that bulges outward from the rest of the eyeball. The rest of the eyeball is also covered by a white, opaque layer called the sclera. As such, when emitted electromagnetic radiation strikes the eyeball, electromagnetic radiation reflected from the cornea and/or sclera can received at an electromagnetic emitter/sensor.

When electromagnetic radiation reflects from a leading surface of the cornea rather than the sclera (or a trailing surface of the cornea), the electromagnetic radiation can have less distance to travel before being reflected. As such, when the cornea is close to a specific sensor, a corresponding glint appears closer to the sensor as well. Also, when the cornea is farther from a specific sensor, a corresponding glint appears farther from the sensor.

As the sensors in head mountable display 200 are mounted on lens frame 208 near the edges of lens 206, when the cornea is near a closer edge of lens 206, corresponding glints appear closer to the closer edge. Thus, a pair of glints reflecting electromagnetic radiation emitted from sensors mounted on the closer edge appear farther apart than a pair of glints reflecting electromagnetic radiation emitted from sensors mounted on an edge opposite to the closer edge.

Based on the data about the received reflected electromagnetic radiation, a computing device, perhaps associated with head mountable display 200, can determine an estimated position $P_{A'}$ of the iris and pupil of the right eye at $T_{A'}$ is approximately centered within lens 208.

Figure 2B:
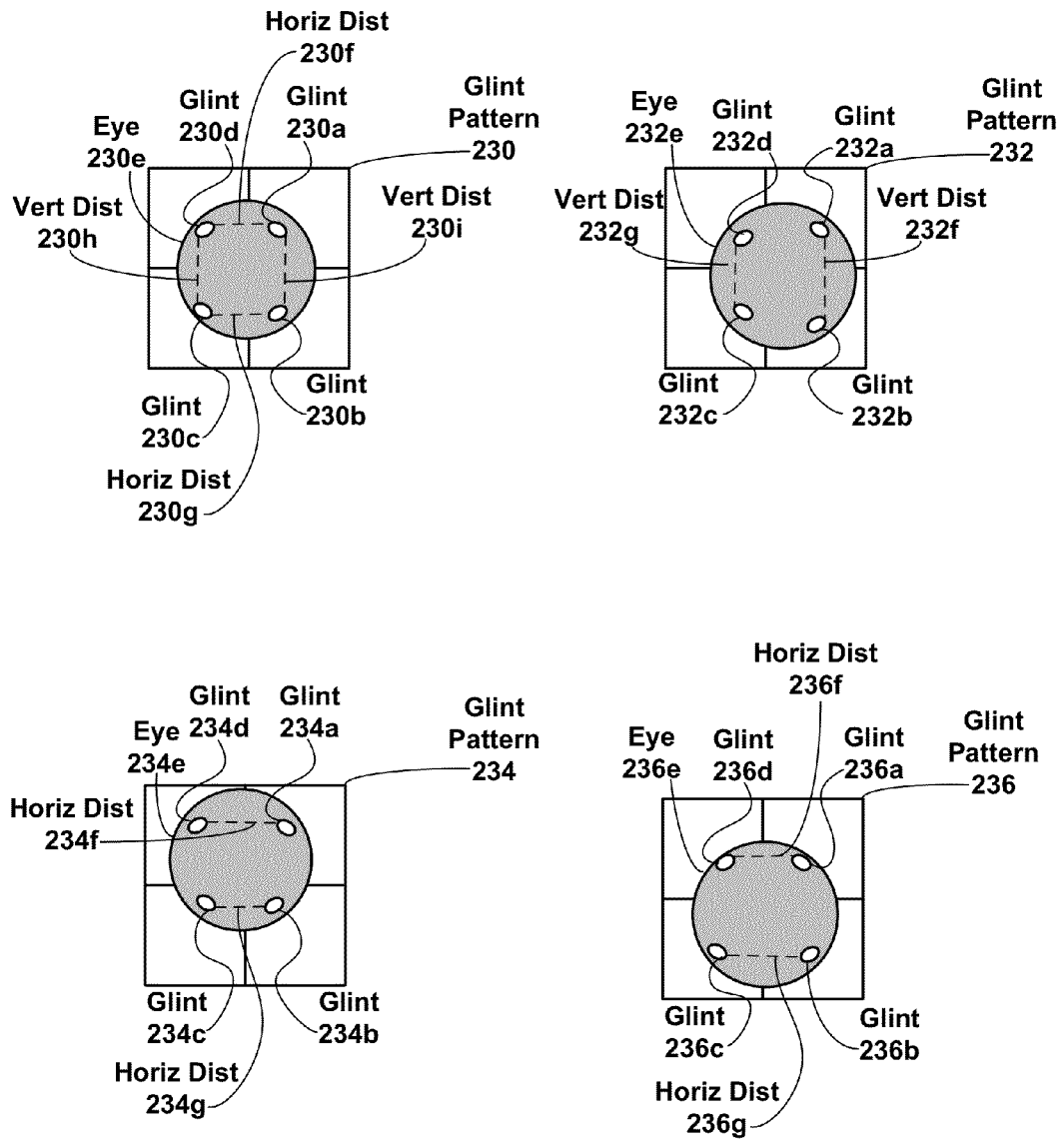
FIG. 2B shows example glint patterns, according to an example embodiment.

FIG. 2B shows example glint pattern 230 that represents glints reflected from a surface of the right eye at position A'. Glint pattern 230 shows four glints 230a-230d respectively corresponding to sensors 220a-220d. FIG. 2B shows horizontal distance 230f, which is the shortest distance between glints 230a and 230d; e.g., the top pair of glints in glint pattern 230, as being approximately equal to horizontal distance 230g, which is the shortest distance between glints 230b and 230c; e.g., the bottom pair of glints in glint pattern 230. As horizontal distances 230f and 230g are approximately equal, the computing device can determine that the cornea, and corresponding pupil and iris, is approximately horizontally centered between a top horizontal line between sensors 220a and 220d and a bottom horizontal line between sensors 220b and 220c.

Similarly, FIG. 2B shows vertical distance 230h, which is the shortest distance between glints 230c and 230d; e.g., the left pair of glints in glint pattern 230, as being approximately equal to vertical distance 230i, which is the shortest distance between glints 230a and 230b; e.g., the right pair of glints in glint pattern 230. As vertical distances 230h and 230i are approximately equal, the computing device can determine that the cornea, and corresponding pupil and iris, is approximately vertically centered between a left vertical line between sensors 220c and 220d and a right vertical line between sensors 220a and 220b. Thus, the computing device can determine that the cornea is approximately both horizontally and vertically centered at $T_{A'}$.

A statistical model to infer eye positions can be developed based on example glint data. For example, a statistical modeling approach, such as maximum likelihood estimation, can be used to detail the statistical model. Maximum likelihood estimation takes a given probability distribution model (a.k.a. the statistical model), and a "sample" or collection of data for the given probability distribution model, and generates a parameters for the model that maximize the likelihood of the sample for the given probability distribution model. In some embodiments, the sample can include a number of independent observations of glints.

A multi-dimensional mapping of sensor data to eye position can be used. For example, each sensor input can act as one dimension of an N-dimensional space, where N=the number of sensors (e.g., N=4 for head mountable display 200). At any given time, the sensors place the eye at one point in the N-dimensional space. Each point in the N-dimensional space can be mapped to a two-dimensional eye position. In some embodiments, the mapping can also provide a blink indication of the two-dimensional eye position and/or a confidence level of the two-dimensional eye position. To generate the N-dimensional to two-dimensional mapping, the above-mentioned maximum likelihood estimation technique can be used to map the N-dimensional sensor inputs to a sample of previously recorded two-dimensional calibration data. Other calibration techniques are possible as well; for example, additional calibration techniques are discussed below in the context of FIG. 2C.

Additionally, the N-dimensional to two-dimensional mapping can be used as a statistical model to predict eye position. For example, a recursive state estimation algorithm or similar position-prediction algorithm can use the N-dimensional to two-dimensional mapping to determine a likelihood of the eye being in a given two-dimensional position based on a previous two-dimensional position of the eye, and thus continuously model the movements of the eye.

As another example, suppose at a time $T_{B'}$, the cornea, including iris and pupil of the right eye of the wearer, is located at position B' shown in FIG. 2A; i.e., relatively near a right edge of lens 208. A computing device, perhaps associated with head mountable display 200, can determine an estimated position $P_{B'}$ of the iris and pupil of the right eye at $T_{B'}$ is near the right edge of lens 208.

At time $T_{B'}$, electromagnetic emitter/sensors 220a-220d can emit electromagnetic radiation toward the right eye and the emitted light can be reflected from the surface of the right eye as a glint pattern. FIG. 2B shows example glint pattern 232 that represents glints reflected from a surface of the right eye at position B'. Glint pattern 232 shows four glints 232a-232d respectively corresponding to sensors 220a-220d.

FIG. 2B shows vertical distance 232g, which is the shortest distance between glints 232c and 232d as being shorter than vertical distance 230f, which is the shortest distance between glints 230a and 230b. That is, glints 232a and 232b are closer to respective electromagnetic emitter/sensors 220a and 220b than glints 232c and 232d are to respective electromagnetic emitter/sensors 220c and 220d. The computing device can utilize this data to determine that the cornea, and corresponding pupil and iris, is closer to sensors 220a and 220b, and thus closer to a right edge of lens 208.

As another example, suppose at a time $T_{C'}$, the cornea, including iris and pupil of the right eye of the wearer, is located at position C' shown in FIG. 2A; i.e., relatively near a top edge of lens 208. A computing device, perhaps associated with head mountable display 200, can determine an estimated position $P_{C'}$ of the iris and pupil of the right eye at $T_{C'}$ is near the top edge of lens 208.

At time $T_{C'}$, electromagnetic emitter/sensors 220a-220d can emit electromagnetic radiation toward the right eye and the emitted light can be reflected from the surface of the right eye as a glint pattern. FIG. 2B shows example glint pattern 234 that represents glints reflected from a surface of the right eye at position C'. Glint pattern 234 shows four glints 234a-234d respectively corresponding to sensors 220a-220d.

FIG. 2B shows horizontal distance 234f, which is the shortest distance between glints 234a and 234d as being longer than horizontal distance 234g, which is the shortest distance between glints 234b and 234c. That is, glints 234a and 234d are closer to respective electromagnetic emitter/sensors 220a and 220d than glints 234b and 234c are to respective electromagnetic emitter/sensors 220b and 220c. The computing device can utilize this data to determine that the cornea, and corresponding pupil and iris, is closer to sensors 220a and 220d, and thus closer to a top edge of lens 208.

As another example, suppose at a time $T_{D'}$, the cornea, including iris and pupil of the right eye of the wearer, is located at position D' shown in FIG. 2A; i.e., relatively near a bottom edge of lens 208. A computing device, perhaps associated with head mountable display 200, can determine an estimated position $P_{D'}$ of the iris and pupil of the right eye at $T_{D'}$ is near the bottom edge of lens 208.

At time $T_{D'}$, electromagnetic emitter/sensors 220a-220d can emit electromagnetic radiation toward the right eye and the emitted light can be reflected from the surface of the right eye as a glint pattern. FIG. 2B shows example glint pattern 236 that represents glints reflected from a surface of the right eye at position D'. Glint pattern 236 shows four glints 236a-236d respectively corresponding to sensors 220a-220d.

FIG. 2B shows horizontal distance 236f, which is the shortest distance between glints 236a and 236d as being shorter than horizontal distance 236g, which is the shortest distance between glints 236b and 236c. That is, glints 236a and 234d are farther from respective electromagnetic emitter/sensors 220a and 220d than glints 236b and 236c are to respective electromagnetic emitter/sensors 220b and 220c. The computing device can utilize this data to determine that the cornea, and corresponding pupil and iris, is closer to sensors 220b and 220c, and thus closer to a bottom edge of lens 208.

To ensure accuracy of glint data, sensors 220a-220d can be calibrated using calibration values. In some embodiments, calibration may be performed when system resources allow; e.g., calibration may not performed unless a predetermined number of processor cycles per unit time and/or a predetermined amount of idle memory is available for calibration.

In other embodiments, calibration can be performed in response to an event, such as displaying a cursor and/or other imagery on lens 208 of head mountable display 200. The event may include a prompt; e.g., "Please look at the cursor to calibrate the display." In particular embodiments, a calibration process can be invoked as a process or sub-process of a first process. For example, the first process can be a process of locking or unlocking a computing device, such as restricting access to or "locking" head mountable display 200 while the owner (or other authorized user) of the head mountable display is not using/wearing the head mountable display and/or allowing access to or "unlocking" when the owner (or other authorized user) of the head mountable display chooses to use a locked head mountable display 200.

The process of locking/unlocking the computing device can involve a user of head mountable display 200 looking at a pattern of images, such as colored blocks, perhaps in a specific order. For example, if the pattern of images includes one or more images of numeric digits or letters, then the ordered pattern of images may spell out a password or pass phrase. As the user looks at each image in order, head mountable display 200 can determine a likely image the user is likely looking at and can perform calibration between a detected gaze position and an intended gaze position.

Calibration may involve determining calibration values to align detected gaze position(s) and intended gaze position(s). For example, if a detected gaze position is at $(x_d, y_d)$ in the plane of lens 208 and an intended gaze position is at ($x_{int}$, $y_{int}$), then an error ($x_{CAL}$, $y_{CAL}$) between the intended and detected gaze positions can be determined as ($x_{CAL}$, $y_{CAL}$)=($x_{int}$−$x_d$, $y_{int}$−$y_d$). The ($x_{CAL}$, $y_{CAL}$) calibration values can be averaged, smoothed, correlated, and/or otherwise processed prior to being used. The ($x_{CAL}$, $y_{CAL}$) calibration values can be stored as calibration values on a per head-mountable display basis, on a per-sensor basis, or according to some other arrangement. After calibration, the ($x_{CAL}$, $y_{CAL}$) calibration values can be added to the detected gaze position to get the intended position: ($x_d$+$x_{CAL}$, $y_d$+$y_{CAL}$). For example, if error values are used as ($x_d$+$x_{CAL}$, $y_d$+$y_{CAL}$), then ($x_d$+$x_{CAL}$, $y_d$+$y_{CAL}$)=($x_d$+$x_{int}$−$x_d$, $y_d$+$y_{int}$−$y_d$)=($x_{int}$, $y_{int}$).

Figure 2C:
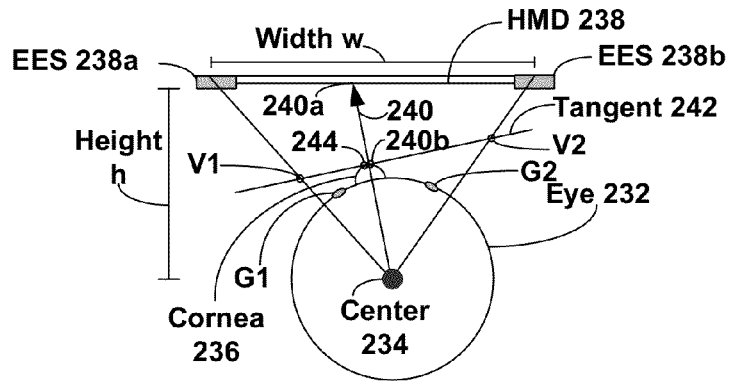
FIG. 2C shows an example eye, according to an example embodiment.

FIG. 2C shows eye 232, according to an example embodiment, shown near EESs 238a, 238b of HMD 238 that are a width w and a depth d from a center 234 of eye 232. For example, head mountable display 200 shown in FIG. 2A can act as HMD 238. Eye 234 can be looking through cornea 236 in gaze direction 240. Gaze direction 240 touches HMD 238 at gaze point 240a. While gazing, a closest point 244 of cornea 236 to HMD 238 can be determined, and a tangent plane 242 including closest point 244 can be drawn.

As shown in FIG. 2C, tangent plane 242 intersects: a line segment from center 234 to EES 238a at point V1, gaze direction 240 at point 240b, and a line segment from center 234 to EES 238b at point V2. FIG. 2C also shows reflections G1 and G2 on eye 230 from radiation from respective EESs 238a, 238b that can be captured as glint data.

Figure 2D:
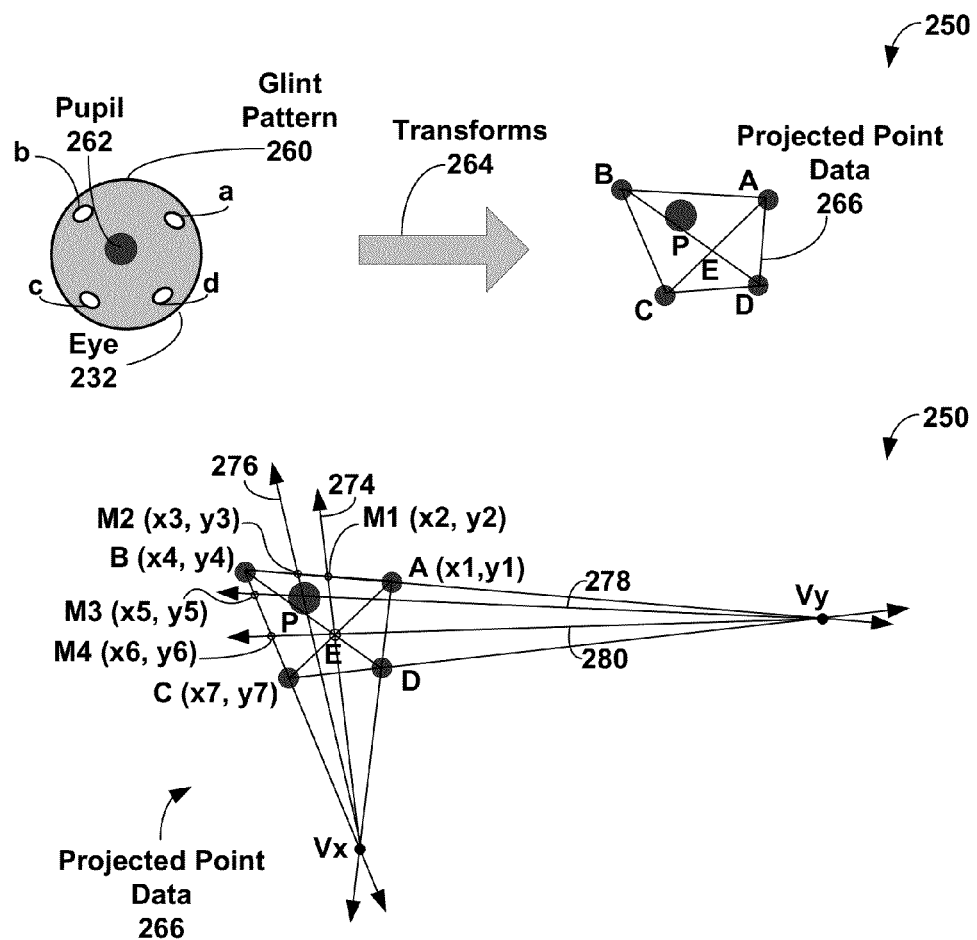
FIG. 2D shows an example calibration process, according to an example embodiment.

FIG. 2D shows calibration process 250, according to an example embodiment. Calibration process 250 can begin by obtaining the glint data, such as glint pattern 260 with pupil position 262, from an eye, such as eye 232, looking at an intended gaze point ($x_{int}$, $y_{int}$). For example, gaze point ($x_{int}$, $y_{int}$) can be gaze point 240a shown in FIG. 2C.

One or more transforms 264 can be performed on the glint data to generate projected point data 266. For example, a point $p_1$ in the glint data can be transformed to a point $p_1'$ in projected point data by a transform, such as: $p_1' = p_1 + c_1 + c_2 (p_1 - X)$, where $c_1$, $c_2$ are predetermined values, and X is a predetermined point in the glint data; e.g. such as, but not limited to, a position of pupil 262 or coordinates of a predetermined point; e.g., a central point, upper-left corner point, or lower-right corner point. Other transforms 264 are possible as well. In some embodiments, transforms 264 may not be used.

FIG. 2D shows five example points in projected point data 266: A, B, C, D, and P. Points A, B, C, and D in projected point data 266 correspond, respectively, to positions of glints a, b, c, and d of glint pattern 260. Point P in projected point data 266 corresponds to a position of pupil 262. Point E can be determined as the intersection of the AC and BD line segments.

FIG. 2D shows that an x-vanishing point Vx can be determined based on projected point data 266. Vx is determined as the intersection of rays $\overrightarrow{BC}$ and $\overrightarrow{AD}$. Points M1 and M2 can be determined, where M1 is the intersection of line segment AB with ray 274. Ray 274 of FIG. 2D starts at x-vanishing point Vx and passes through point E. M2 is the intersection of line segment AB with ray 276, where ray 276 starts at Vx and passes through point P as shown in FIG. 2D.

Then, an x-cross ratio $CR_x$ can be determined. For example, let the coordinates of A, M1, M2, and B be, respectively, (x1, y1), (x2, y2), (x3, y3), and (x4, y4), as shown in FIG. 2D. Additionally, let D1 be the distance from A to M2=$\sqrt{(x3-x1)^2+(y3-y1)^2}$, D2 be the distance from M1 to M2=$\sqrt{(x3-x2)^2+(y3-y2)^2}$, D3 be the distance from A to B=$\sqrt{(x4-x1)^2+(y4-y1)^2}$, and D4 be the distance from M1 to B=$\sqrt{(x4-x2)^2+(y4-y2)^2}$. Then, let the x-cross ratio $CR_x$ be $CR_x$=D1/D2/D3/D4.

Further, a y-vanishing point Vy and y-cross ratio $CR_y$ can be determined. Vy is determined as the intersection of rays $\overrightarrow{BA}$ and $\overrightarrow{CD}$. Points M3 and M4 can be determined, where M3 is the intersection of line segment BC with ray 258. Ray 278 of FIG. 2D starts at y-vanishing point Vy and passes through point P. M4 is the intersection of line segment BC with ray 280, where ray 280 starts at Vy and passes through point E as shown in FIG. 2D.

To determine y-cross ratio $CR_y$, let the coordinates of B, M3, M4, and C be, respectively, (x4, y4), (x5, y5), (x6, y6), and (x7, y7), as shown in FIG. 2D. Further, let D5 be the distance from B to M4=$\sqrt{(x6-x4)^2+(y6-y4)^2}$, D6 be the distance from M3 to M4=$\sqrt{(x6-x5)^2+(y6-y5)^2}$, D7 be the distance from B to C=$\sqrt{(x7-x4)^2+(y7-y4)^2}$, and D8 be the distance from M3 to C=$\sqrt{(x7-x5)^2+(y7-y5)^2}$. Then, let the y-cross ratio $CR_y$ be $CR_y$=D5/D6/D7/D8.

Recall that gaze point 240a is at coordinates ($x_{int}$, $y_{int}$). The coordinates of the gaze point can be estimated as: $x_{int}$=w+$CR_x$/1+$CR_x$ and $y_{int}$=d+$CR_y$/1+$CR_y$. These estimated coordinates can be compared to expected coordinates of a gaze point being observed during calibration process 250. For example, calibration process 250 can take place in response to an event, such as the display of a cursor and/or other imagery, as discussed above. Then, let ($x_{exp}$, $Y_{exp}$) be the expected coordinates for a gaze point during the event. For example, ($x_{exp}$, $Y_{exp}$) can be coordinates of a center point or other point of interest within the cursor and/or other imagery displayed by HMD 238. Then, error ($x_{CAL}$, $y_{CAL}$) between the estimated gaze point coordinates ($x_{int}$, $y_{int}$) and the expected gaze point coordinates ($x_{exp}$, $Y_{exp}$) can be calculated in a similar fashion to that discussed above; e.g., ($x_{CAL}$, $y_{CAL}$)=($x_{int}$−$x_{exp}$, $y_{int}$−$y_{exp}$).

Figure 3A:
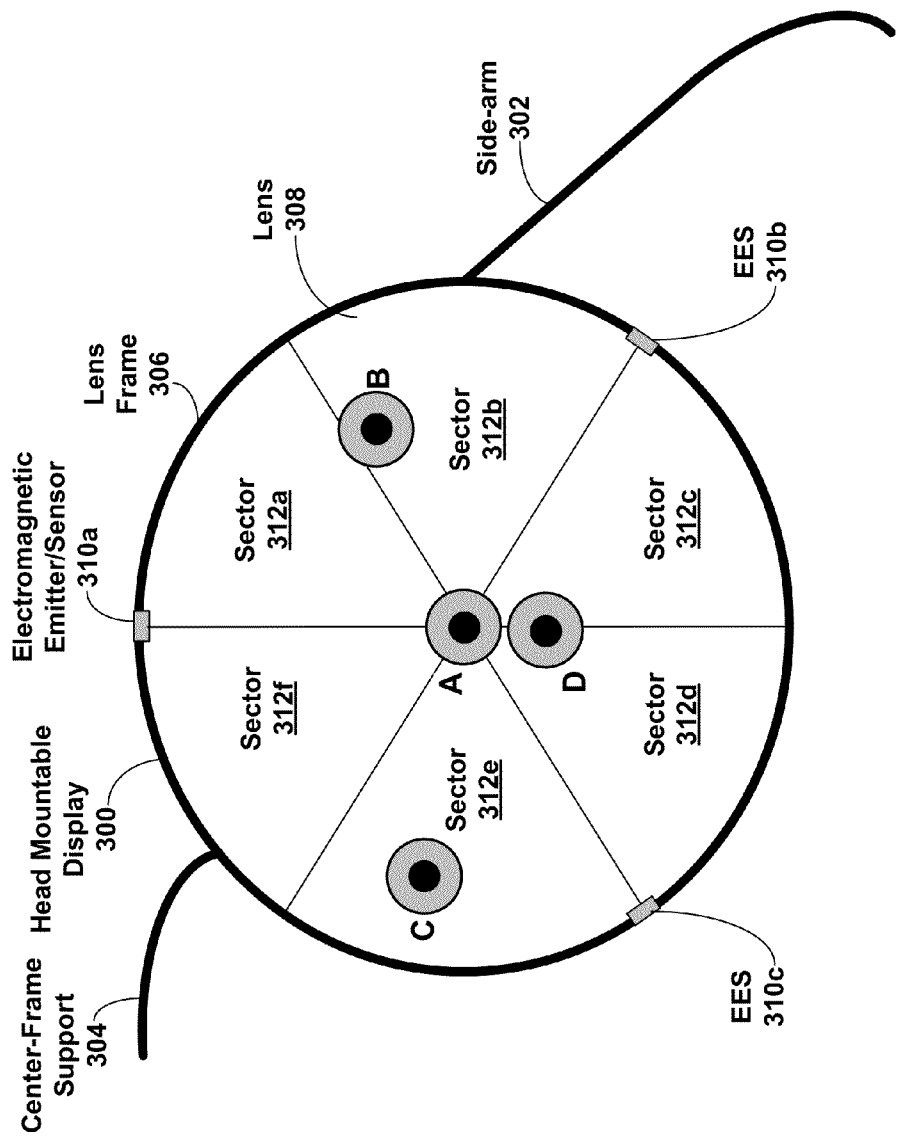
FIG. 3A is a block diagram illustrating a head mountable display configured to determine eye positions, according to an example embodiment.

FIG. 3A is a block diagram illustrating head mountable display 300 configured to determine eye positions, according to an example embodiment. Head mountable display 300 can be implemented as part or all of head mountable displays 200, 320, 402, 502, 602, and 702, and/or computing device 802.

FIG. 3A shows a right side of head mountable display 300 that includes side-arm 302, center-frame support 304, lens frame 306, lens 308, and electromagnetic emitter/sensors (EESs) 310a-310c. The center frame support 304 and extending side-arm 302, along with a left extending side-arm (not shown in FIG. 3A) can be configured to secure head-mounted device 300 to a wearer's face via a wearer's nose and ears, respectively. Lens frame 306 can be configured to hold lens 308 at a substantially uniform distance in front of an eye of the wearer.

FIG. 3A shows lens 308 divided into sectors 312a-312f by electromagnetic emitter/sensors 310a-310c. For example, sector 312a can be defined by a line from electromagnetic emitter/sensor 310a to a center of lens 308, a line from lens frame 306 to the center of lens 308 that is equidistant from both electromagnetic emitter/sensor 310a and electromagnetic emitter/sensor 310b, and a portion of lens frame 306 between electromagnetic emitter/sensors 310a and 310b.

Each of electromagnetic emitter/sensors 310a-310c can be configured to emit and/or sense electromagnetic radiation in one or more frequency ranges. In one example, each of electromagnetic emitter/sensors 310a-310c can be configured to emit and sense infrared light. The emitted electromagnetic radiation can be emitted at one or more specific frequencies or frequency ranges, such as an infrared frequency, to both aid detection and to distinguish the emitted radiation from background radiation, such as ambient light. In other embodiments, the emitted electromagnetic radiation can be emitted using a specific pattern of frequencies or frequency ranges to better distinguish emitted radiation from background radiation and to increase the likelihood of detection of the emitted radiation after reflection from the eye.

Electromagnetic emitter/sensors 310a-310c can be configured to emit electromagnetic radiation toward a right eye of a wearer of head mountable display 300 and subsequently detect reflected electromagnetic radiation to determine a position of a portion of the right eye of the wearer. For example, electromagnetic emitter/sensor 310a can be configured to emit and receive electromagnetic radiation at or near the top of the right eye of the wearer, while electromagnetic emitter/sensor 310c can be configured to emit and receive electromagnetic radiation at or near the left side of the right eye of the wearer.

For example, suppose at a time $T_A$ the iris and pupil of the right eye of the wearer were located at position A shown in FIG. 3A; i.e., at the center of lens 308. At time $T_A$, let electromagnetic emitter/sensors 310a-310c emit electromagnetic radiation toward the eye of the wearer, where the emitted light can be reflected from the surface of the eye. Shortly after $T_A$, electromagnetic emitter/sensors 310a-310c can receive the reflected electromagnetic radiation and provide data about the reflected electromagnetic radiation to head mounted display 300 and/or other devices.

Based on the data about the received reflected electromagnetic radiation, a computing device, perhaps associated with head mountable display 300, can determine an estimated position $P_A$ of the iris and pupil of the right eye at $T_A$. In this example, the reflected light at each of electromagnetic emitter/sensors 310a-310c is approximately the same, as each sector of lens 308 is equally covered by the iris and pupil of the right eye.

As another example, suppose at a time $T_B$ the iris and pupil of the right eye of the wearer were located at position B shown in FIG. 3A; primarily in sector 312b toward the upper-rightmost portion of lens 308. At time $T_B$, let electromagnetic emitter/sensors 310a-310c emit electromagnetic radiation toward the eye of the wearer, where the emitted light can be reflected from the surface of the eye. Shortly after $T_B$, electromagnetic emitter/sensors 310a-310c can receive the reflected electromagnetic radiation.

In this example, suppose the amounts of received light at each of electromagnetic emitter/sensors 310a-310c as shown in Table 1 below:

TABLE 1

| Sensor(s) | Amount of Received Light (on 1-10 Scale) at $T_B$ |
|---|---|
| 310a | 4 |
| 310b | 3 |
| 310c | 9 |

In other embodiments, one or more of sensors 310a-310c can provide more or less information about received light to wearable computing device 300. As one example, the amount of received light can be expressed using either a single bit, with 0 being dark and 1 being light. As another example, a scale finer than a 1 to 10 scale can be used; e.g., a 0 (dark) to 255 (bright) scale. Additionally or instead, information about frequencies, direction, and/or other features of received light can be provided by one or more of sensors 310a-310c. Upon receiving the light, each of sensors 310a-310c can determine the amount of received light, generate an indication of the amount of received light using one or more of the numerical scales, and provide the indication to head mountable display 300.

Based on the information about received reflected electromagnetic radiation, a computing device, perhaps associated with head mountable display 300, can determine an estimated position of the iris and pupil $P_B$ of the right eye at $T_B$. As the amount of reflected light at sensor 310c is relatively large and the amounts of reflected light at sensors 310b and 310c are relatively small, head mountable display 300 can determine that there is a relatively-large probability that $P_B$ is within either sector 312a or 312b. Then, considering that the reflected light at sensor 310a is slightly higher (4 out of 10) than at sensor 310b (3 out of 10), head mountable display 300 can determine that there is a relatively-smaller probability that $P_B$ is within sector 312a than $P_B$ is within sector 312b, and can maintain or perhaps increase a probability that $P_B$ is on a boundary between sector 312a and 312b.

Additionally, suppose at a time $T_C$ the iris and pupil of the right eye of the wearer were located at position C in sector 312e at a nearly-leftmost portion of lens 308. At time $T_C$, let electromagnetic emitter/sensors 310a-310c emit electromagnetic radiation toward the eye of the wearer, where the emitted light can be reflected from the surface of the eye. Shortly after $T_C$, electromagnetic emitter/sensors 310a-310c can receive the reflected electromagnetic radiation.

In this example, suppose the amounts of received light at each of electromagnetic emitter/sensors 310a-310c as shown in Table 2 below:

TABLE 2

| Sensor(s) | Amount of Received Light (on 1-10 Scale) at $T_C$ |
|---|---|
| 310a | 4 |
| 310b | 9 |
| 310c | 2 |

Based on the received reflected electromagnetic radiation, a computing device, perhaps associated with head mountable display 300, can determine an estimated position of the iris and pupil $P_C$ of the right eye at $T_C$. As the amount of reflected light at sensor 310b is relatively large and the amount of reflected light at sensors 310a and 310c is relatively small, head mountable display 300 can determine that there is a relatively-large probability that $P_C$ is within either sector 312e or 312f. Then, considering that the reflected light at sensor 310a is higher (4 out of 10) than at sensor 310b (2 out of 10), head mountable display 300 can determine that there is a relatively-smaller probability that $P_C$ is within sector 312f than $P_C$ is within sector 312e, and can perhaps decrease a probability that $P_C$ is on a boundary between sector 312e and 312f.

As another example, suppose at a time $T_D$ the iris and pupil of the right eye of the wearer were located at position D on the sector 312c/312d boundary at a lower portion of lens 308. At time $T_D$, let electromagnetic emitter/sensors 310a-310c emit electromagnetic radiation toward the eye of the wearer, where the emitted light can be reflected from the surface of the eye. Shortly after $T_D$, electromagnetic emitter/sensors 310a-310c can receive the reflected electromagnetic radiation.

In this example, suppose the amounts of received light at each of electromagnetic emitter/sensors 310a-310c are as shown in Table 3 below:

TABLE 3

| Sensor(s) | Amount of Received Light (on 1-10 Scale) at $T_D$ |
|---|---|
| 310a | 6 |
| 310b | 4 |
| 310c | 4 |

Based on the received reflected electromagnetic radiation, a computing device, perhaps associated with head mountable display 300, can determine an estimated position of the iris and pupil $P_D$ of the right eye at $T_D$. As the amount of reflected light at sensor 310a is relatively large and the amount of reflected light at sensors 310b and 310c is relatively small, head mountable display 300 can determine that there is a relatively-large probability that $P_C$ is within either sector 312c or 312d. Then, considering that the reflected light at sensor 310b is equal to that at sensor 310b (both 4 out of 10), head mountable display 300 can determine that there is a relatively-large probability that a $P_D$ is on a boundary between sector 312c and 312d.

In other embodiments, electromagnetic emitter/sensors 310a-310c can each be configured to emit electromagnetic radiation using part or all of the visible frequency range, the infrared frequency range, the ultraviolet frequency range, and/or another frequency range e.g., microwave, X-ray, etc. Also, each of electromagnetic emitter/sensors 310a-310c can be configured to detect electromagnetic radiation in one or more frequency ranges.

In still other embodiments, some or all of electromagnetic emitter/sensors 310a-310c can be configured to detect electromagnetic radiation only; e.g., act as a camera. In still other embodiments, head mountable display 300 can be configured with more or fewer electromagnetic emitter/sensors 310a-310c than shown in FIG. 3A.

Other portions of the eye can be detected as well. For example, suppose each of electromagnetic emitter/sensors 310a-310c receive approximately equal amounts of received electromagnetic radiation, and each amount is relatively low. Then a computing device, perhaps part of head mountable display 300, can infer the electromagnetic radiation is not being reflected from the eye, but from an eyelid. In this case, by inferring the electromagnetic radiation is reflected from an eyelid, the computing device can infer that the eye is closed and that the wearer is either blinking (closed the eye for a short time) or has shut their eyes (closed the eye for a longer time).

To determine if the wearer is blinking or has shut their eyes, the computing device can wait a predetermined amount of time, and then request a second set of indications of reflected electromagnetic radiation from the electromagnetic emitter/sensors.

The predetermined amount of time can be based on a blink duration and/or a blink interval. In adult humans, a blink duration, or how long the eye is closed during a blink is approximately 300-400 milliseconds, and a blink rate, or how often the eye is blinked under typical conditions, is between two and ten blinks per minute; i.e., one blink per every six to thirty seconds.

For example, let the pre-determined amount of time be longer than a blink interval but less than a blink duration. Then, if the indications of reflected electromagnetic radiation were taken from a closed eye during a blink, then the requested second set of indications of reflected electromagnetic radiation taken after the pre-determined amount of time should be from an open eye, if the wearer were blinking. If the second set of second set of indications of reflected electromagnetic radiation were taken from a closed eye as well, additional sets of indications of received electromagnetic radiation can be generated, perhaps at random intervals of time, to determine whether the eye is closed by receiving additional sets of indications with relatively low and uniform amounts of received electromagnetic radiation, or whether the eye is now open and determine if a blink was detected.

Using additional sets of indications of received electromagnetic radiation taken from another eye of the wearer can determine if the wearer has both eyes open, both eyes closed, or has one eye open; e.g., is winking. Also, indications of received electromagnetic radiation taken from another eye can be used to confirm values of received electromagnetic radiation when both eyes can be inferred to be closed.

Other techniques can be used to determine a position of an eye beyond those described herein.

Figure 3B:
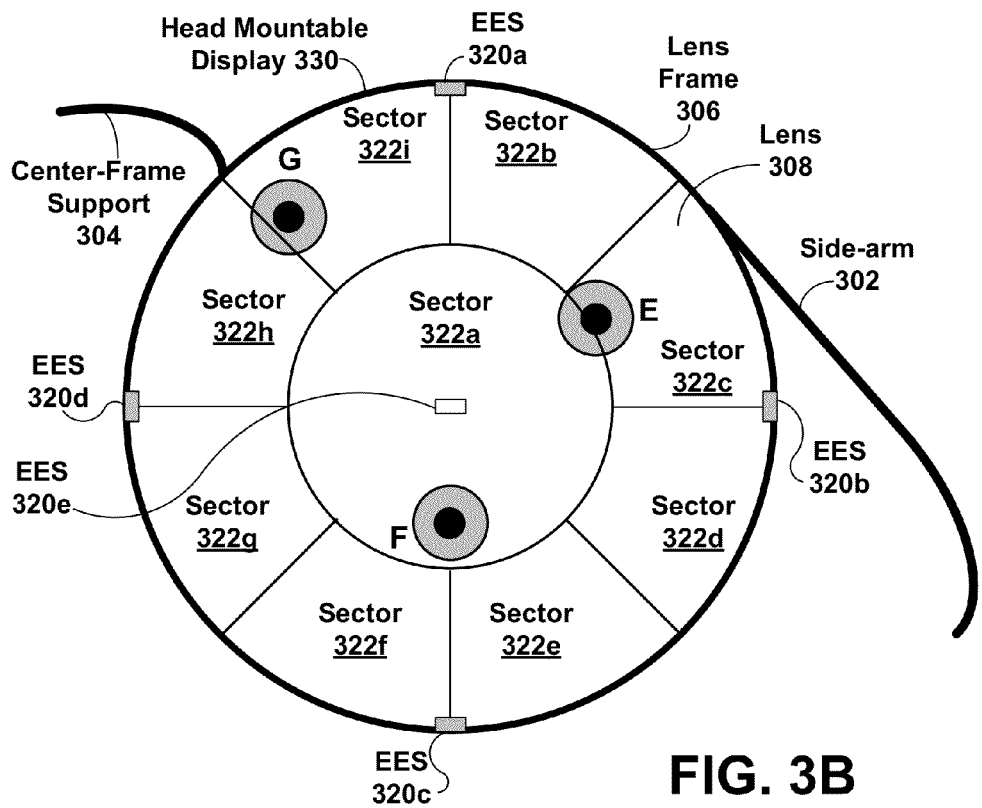
FIG. 3B is a block diagram illustrating another head mountable display configured to determine eye positions, according to an example embodiment.

FIG. 3B is a block diagram illustrating head mountable display 330 configured to determine eye positions, according to an example embodiment. Head mountable display 330 can be implemented as part or all of head mountable displays 300, 402, 502, 602, and 702, and/or computing device 802.

FIG. 3B shows a right side of head mountable display 330 that includes side-arm 302, center-frame support 304, lens frame 306, lens 308, and electromagnetic emitter/sensors (EESs) 320a-320e. Side-arm 302, center frame support 304, and lens frame 306 are as discussed above in the context of FIG. 3A.

FIG. 3B shows electromagnetic emitter/sensor 320e at the center of lens 308. Electromagnetic emitter/sensor 320e can be embedded within lens 308 and/or be a component of a layer of material overlaying part or all of lens 308. In some embodiments, electromagnetic emitter/sensor 320e is configured to be invisible or nearly invisible to the human eye. In other embodiments, electromagnetic emitter/sensor 320e is not located at the center of lens 308. In still other embodiments, multiple electromagnetic emitter/sensors are embedded within lens 308 and/or be a component of a layer of material overlaying part or all of lens 308.

Lens 308 is shown in FIG. 3B as divided into sectors 322a-322i by electromagnetic emitter/sensors 320a-320e. In particular, sector 322a is defined by the circle whose radius is one half of a distance from the center of lens 308, where electromagnetic emitter/sensor 320e is located, to each of electromagnetic emitter/sensors 320a-320d.

As another example, sector 322b is defined by a line from electromagnetic emitter/sensor 310a to a center of lens 308, an upper-right portion of the sector boundary of sector 322a, a line from lens frame 306 to the center of lens 308 that is equidistant from both electromagnetic emitter/sensor 320a and electromagnetic emitter/sensor 320b, and a portion of lens frame 306 between electromagnetic emitter/sensors 320a and 320b.

Each of electromagnetic emitter/sensors 320a-320e can be configured to emit and/or sense electromagnetic radiation in one or more frequency ranges, as discussed above in the context of FIG. 3A. Each of electromagnetic emitter/sensors 310a-310c can be configured to emit electromagnetic radiation toward a right eye of a wearer of head mountable display 300 and subsequently detect reflected electromagnetic radiation to determine a position of a portion of the right eye of the wearer, as discussed above in the context of FIG. 3A.

For example, suppose at a time $T2_A$ the iris and pupil of the right eye of the wearer were located at position A shown in FIG. 3A; i.e., at the center of lens 308. At time $T2_A$, let electromagnetic emitter/sensors 320a-320e emit electromagnetic radiation toward the eye of the wearer, where the emitted light can be reflected from the surface of the eye. Shortly after T2$_A$, electromagnetic emitter/sensors 320a-320e can receive the reflected electromagnetic radiation and provide data about the reflected electromagnetic radiation to head mounted display 330 and/or other devices.

Based on the data about received reflected electromagnetic radiation, a computing device, perhaps associated with head mountable display 330, can determine a position of the iris and pupil of the right eye at T2$_A$. In this example, the reflected light received at electromagnetic emitter/sensor 320e is relatively low and the reflected light at each of electromagnetic emitter/sensors 320a-320d is approximately the same and brighter than the reflected light received at sensor 320e. This observation can be due to the iris and pupil of the right eye being very close to sensor 320e and being approximately equidistant and farther from each of each of electromagnetic emitter/sensors 320a-320d.

As another example, suppose at a time T$_E$ the iris and pupil of the right eye of the wearer were located at position E shown in FIG. 3B; primarily in sector 322c with some overlap into sector 322a toward the upper-rightmost portion of lens 308. At time T$_E$, let electromagnetic emitter/sensors 320a-320e emit electromagnetic radiation toward the eye of the wearer, where the emitted light can be reflected from the surface of the eye. Shortly after T$_E$, electromagnetic emitter/sensors 320a-320e can receive the reflected electromagnetic radiation.

In this example, suppose the amounts of received light at each of electromagnetic emitter/sensors 320a-320e as shown in Table 4 below:

TABLE 4

| Sensor(s) | Amount of Received Light (on 1-10 Scale) at T$_E$ |
|---|---|
| 320a | 4 |
| 320b | 2 |
| 320c | 8 |
| 320d | 9 |
| 320e | 3 |

In other embodiments, one or more of sensors 320a-320e can provide more or less information about received light, as discussed above in the context of FIG. 3A.

Based on the information about received reflected electromagnetic radiation, a computing device, perhaps associated with head mountable display 330, can determine an estimated position of the iris and pupil P$_E$ of the right eye at T$_E$. As the amounts of reflected light at sensors 320c and 320d are relatively large and the amounts of reflected light at sensors 320a, 320b and 320e is relatively small, head mountable display 330 can determine that there is a relatively-large probability that P$_B$ is in the upper-right quarter of lens 308 within either the upper-right portion of sector 322a, in sector 322b or in sector 322c. Then, considering that the reflected light at sensor 320a is slightly higher (4 out of 10) than at sensor 320e (3 out of 10), and that the reflected light at sensor 320b (2 out of 10) is slightly lower than at sensor 320e, head mountable display 330 can determine that P$_B$ is (in decreasing orders of likelihood) either: (1) on a boundary between sector 322c and sector 322a within sector 322c, (2) within sector 322a, (3) on a boundary between sector 322a and 322b, (4) on a boundary between sector 322a and 322b, or (5) within sector 322b.

In embodiments not shown in either FIG. 3A or FIG. 3B, a left side of head mountable display 300 or 330 can be configured with a side-arm, lens-support, lens, and electromagnetic emitter/sensors, and connected to the right side of head mountable display 300 or 320 via center-frame support 304. In these embodiments, the left side of head mountable display 300 and/or 330 can be configured with electromagnetic emitter/sensors for a left eye of the wearer.

Figure 3C:
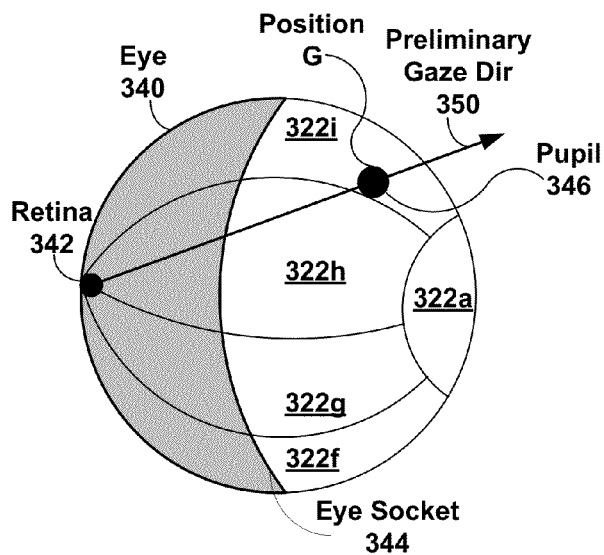
FIG. 3C is a cut-away diagram of an eye, according to an example embodiment.

FIG. 3C is a cut-away diagram of eye 340, according to an example embodiment. FIG. 3C shows retina 342 at the back of eye 340 within eye socket 344. Sectors 222a and 222f-222i are projected onto a front surface of eye 340. FIG. 3C shows a pupil 346 of eye 340 in a position G., which corresponds to position G of FIG. 3B. As shown in both FIGS. 3B and 2C, pupil 346 at position G is in sector 222i while also being close to the boundary with sector 222h.

Preliminary gaze direction 350 of eye 340 can be determined based on a determined position of pupil 346. Pupil 346 can be determined to be in position G, perhaps using the techniques discussed above in the context of FIGS. 3A and 3B. Then, preliminary gaze direction 350 can be determined as a line segment starting at retina 342 and passing through pupil 346. As pupil 346 has been determined to be at position G, preliminary gaze direction 350 passes through position G as well. Thus, preliminary gaze direction 350 can be determined based on the determined position G of pupil 346.

In some embodiments, a head-position vector or other data related to head movement can be determined using one or more accelerometers or other sensors configured to detect head movement. For example, head-mounted device 300, 330, 402, 502, 602, and/or 702 can equipped with a sensor such as sensor 422 that is configured to generate a head-position vector indicating a tilt of the head.

Then, a computing device, such as computing device 802, that can be associated with head-mounted device 300, 330, 402, 502, 602, and/or 702 can combine the head-position vector, indicating head tilt, and the preliminary gaze direction, indicating eye gaze, to generate a final gaze direction that indicates the eye gaze after taking head tilt into consideration. For example, suppose the head-position vector and preliminary gaze direction 350 are both vectors in the same coordinate space. Then, the final gaze direction can be determined, at least in part, by performing vector addition on the head-position vector and the preliminary gaze direction vector. Other techniques for generating preliminary gaze directions, head-position vectors, and final gaze directions are possible as well.

Figure 4:
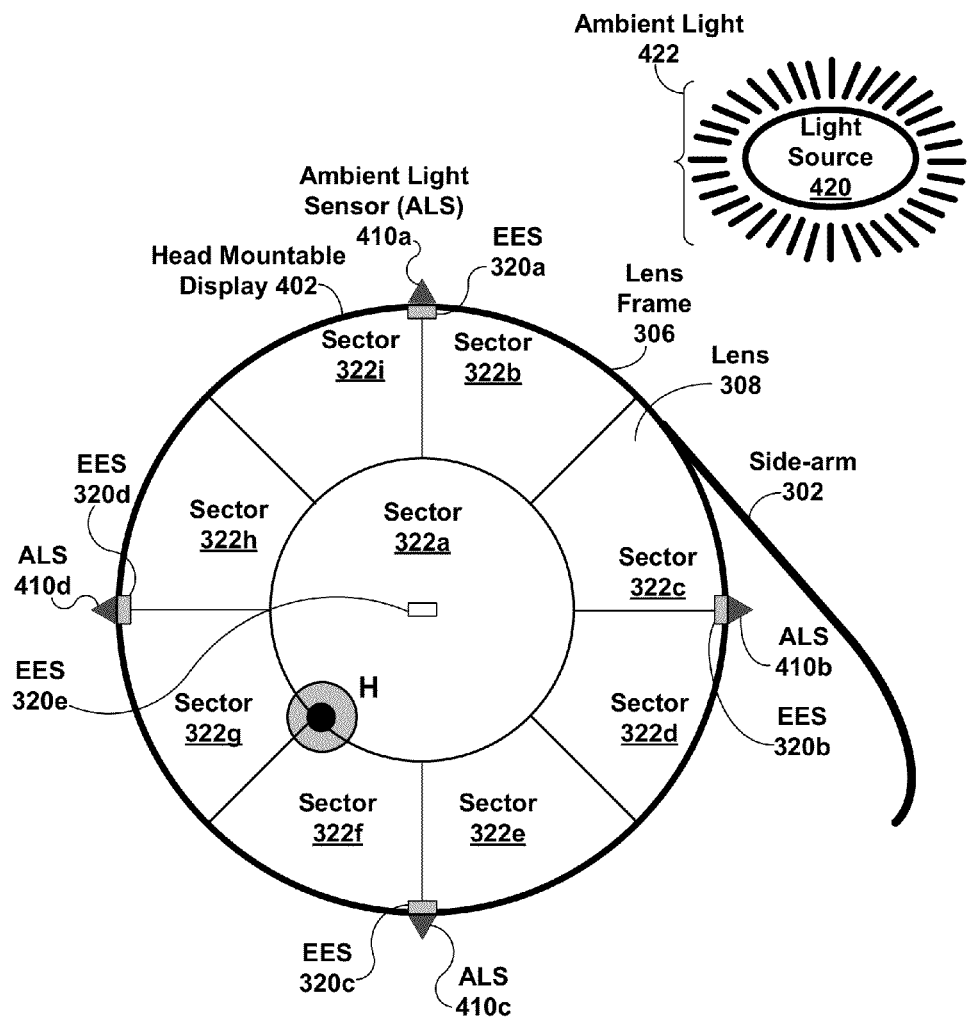
FIG. 4 is a block diagram illustrating a head mountable display configured to determine eye positions and ambient light, according to an example embodiment.

FIG. 4 is a block diagram illustrating a head mountable display 402 configured to determine pupil positions and ambient light, according to an example embodiment. Head mountable display 402 can be implemented as part or all of head mountable displays 300, 330, 502, 602, and 702, and/or computing device 802.

Head mountable display 402 includes the components of head mountable display 330 as shown in FIG. 3B as well as ambient light sensors (ALSs) 410a-410d. Each of ambient light sensors 410a-410d is respectively located near electromagnetic emitter/sensors 320a-320d and is configured to detect ambient light and output an indication of the amount of the detected ambient light. The indication can be binary; e.g., 0 indicating no ambient light and 1 indicating some ambient light, numeric, such as using a 0 (dark) to 10 (bright) scale or as a percentage, qualitative, such as "dark", "dim", "bright", and "very bright", a combination of binary, numeric, qualitative, e.g., dim=15 out of 255 possible, or using some other technique for indicating an amount of ambient light.

As shown in FIG. 4, at a time T$_H$, light source 420 is located above the right side-arm 202 of head mountable display 402 and is emitting ambient light 422. In other scenarios, light source(s) can provide less or more ambient light; while in other scenarios, no ambient light may be present.

FIG. 4 also shows that, at T$_H$, an iris and pupil of an eye of a wearer of head mountable display 402 is at position H, which is at the boundary of sectors 222a, 222f, and 222g. At time $T_H$, let electromagnetic emitter/sensors 210a-210c emit electromagnetic radiation toward the eye of the wearer, where the emitted light can be reflected from the surface of the eye. Shortly after $T_H$, electromagnetic emitter/sensors 210a-210c can receive the reflected electromagnetic radiation.

In this example, suppose the amounts of received light at each of electromagnetic emitter/sensors 210a-210c and the amount of ambient light received at each of sensors 410a-410d are as shown in Table 5 below:

TABLE 5

| Sensors | Received Light (on 1-10 Scale) at $T_H$ | Ambient Light (1-10 Scale) at $T_H$ |
|---|---|---|
| 320a/410a | 9 | 10 |
| 320b/410b | 9 | 8 |
| 320c/410c | 4 | 6 |
| 320d/410d | 4 | 7 |
| 320e | 4 | n/a |

A number of electromagnetic emitter/sensors used to detect emitted electromagnetic radiation can be determined based on a detected amount of ambient light. For example, using the data shown in Table 5 above, all four ambient light sensors 410a-410d indicate at least a moderate level of ambient light and sensor 410a indicates a maximum amount of ambient light. In these conditions with moderate to high amounts of detected ambient light, all of electromagnetic emitter/sensors 320a-320e can be used to increase the likelihood that the emitted electromagnetic radiation is being detected and not being overshadowed by the ambient light In contrast, where there is little or no detected ambient light, fewer electromagnetic emitter/sensors can be used to emit electromagnetic radiation. In these low-light conditions, as the likelihood the emitted electromagnetic radiation from one or a few electromagnetic emitter/sensors is detected and not overcome the (small) amount of ambient light is reasonably high. In some embodiments, electromagnetic emitter/sensors not emitting electromagnetic radiation can still detect the emitted electromagnetic radiation from the other emitting sensor(s). In other embodiments, electromagnetic emitter/sensors not emitting electromagnetic radiation can be turned off and so do not detect the emitted electromagnetic radiation from the other emitting sensor(s).

An electromagnetic emitter/sensor can change emission of electromagnetic radiation based on a detected amount of ambient light. For example, using the numbers in Table 5 above, ambient light sensor 410a may provide an indication to electromagnetic emitter/sensor 320a that ambient light at level 10 of 10 was received. In response, electromagnetic emitter/sensor 320a can change an amount of power, time, wavelength(s), and/or other properties of emitted electromagnetic radiation to be emitted toward an eye of the wearer; for example, electromagnetic emitter/sensor 320a can determine that the ambient light is bright and therefore increase power and/or an amount of time for emitting radiation toward an eye of the wearer, or perhaps change a frequency of emitted radiation to use a frequency not commonly found in ambient light.

As another example, using the numbers in Table 5 above, ambient light sensor 410c may provide an indication to electromagnetic emitter/sensor 320c that ambient light at level 6 of 10 was received. In response, electromagnetic emitter/sensor 320a can determine that the amount of ambient light is relatively moderate and either maintain or change an amount of power, time, wavelength(s), and/or other properties of emitted electromagnetic radiation to be emitted toward an eye of the wearer; for example, electromagnetic emitter/sensor 320a can determine that the ambient light is moderate and therefore maintain power and/or an amount of time for emitting radiation toward an eye of the wearer. Other examples are possible as well.

FIG. 4 also shows that electromagnetic emitter/sensor 320e does not have an associated ambient light sensor. In some embodiments not shown in FIG. 4, head mountable display 402 can be configured with one or more ambient light sensors that are not located near electromagnetic emitters/sensors.

FIG. 4 shows that an electromagnetic emitter/sensor is a separate component from an ambient light sensor component. In some embodiments not shown in FIG. 4, an electromagnetic emitter/sensor component can include the functionality of an ambient light sensor.

Example Systems and Devices

Systems and devices in which example embodiments may be implemented will now be described in greater detail. In general, an example system may be implemented in or may take the form of a wearable computer. However, an example system may also be implemented in or take the form of other devices, such as a mobile phone, among others. Further, an example system may take the form of non-transitory computer readable medium, which has program instructions stored thereon that are executable by at a processor to provide the functionality described herein. An example, system may also take the form of a device such as a wearable computer or mobile phone, or a subsystem of such a device, which includes such a non-transitory computer readable medium having such program instructions stored thereon.

Figure 5A:
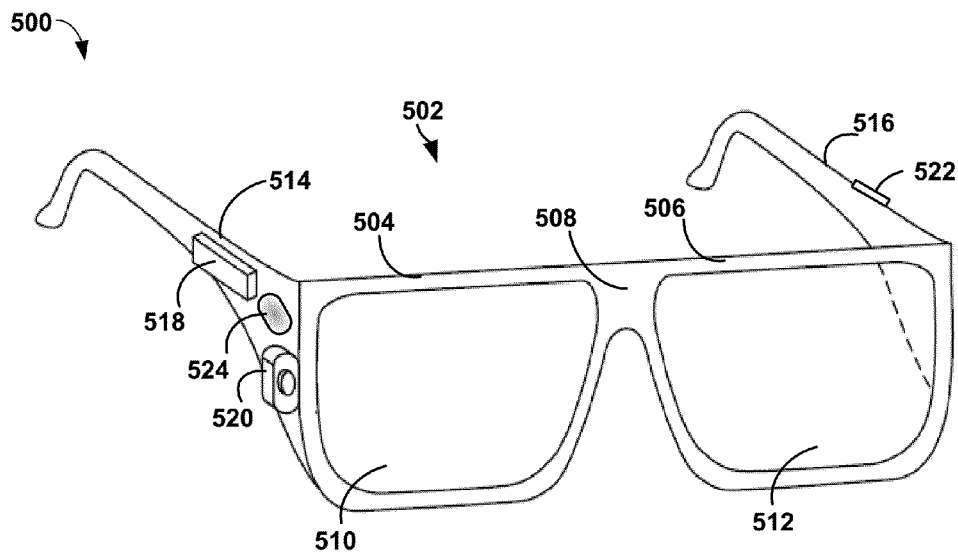
FIGS. 5A and 5B illustrate a wearable computing device (WCD), according to an example embodiment.
Figure 5B:
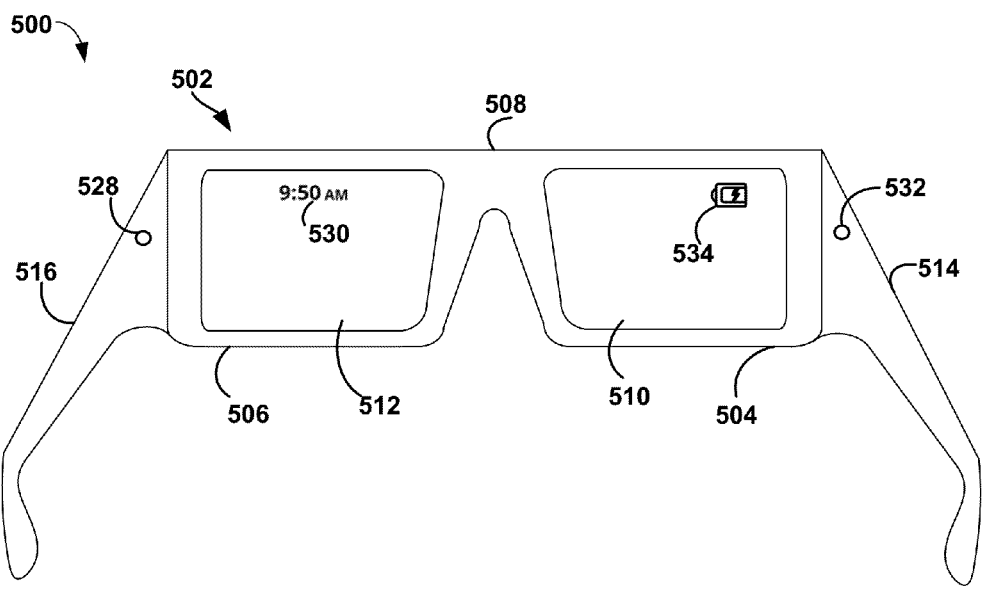

FIGS. 5A and 5B illustrate a wearable computing device 500, according to an example embodiment. In FIG. 5A, the wearable computing device 500 takes the form of a head-mountable device (HMD) 502 (which may also be referred to as a head-mountable display). It should be understood, however, that example systems and devices may take the form of or be implemented within or in association with other types of devices, without departing from the scope of the invention.

As illustrated in FIG. 5A, the head-mountable device 502 comprises frame elements including lens-frames 504 and 506 and a center frame support 508, lens elements 510 and 512, and extending side-arms 514 and 516. The center frame support 508 and the extending side-arms 514 and 516 are configured to secure the head-mountable device 502 to a wearer's face via a wearer's nose and ears, respectively.

Each of the frame elements 504, 506, and 508 and the extending side-arms 514 and 516 may be formed of a solid structure of plastic or metal, or may be formed of a hollow structure of similar material so as to allow wiring and component interconnects to be internally routed through the head-mountable device 502. Other materials may possibly be used as well.

One or both of lens elements 510 and 512 may be formed of any material that can suitably display a projected image or graphic. One or both of lens elements 510 and 512 may also be sufficiently transparent to allow a wearer to see through the lens element. Combining these two features of lens elements 510, 512 can facilitate an augmented reality or heads-up display where the projected image or graphic is superimposed over a real-world view as perceived by the wearer through the lens elements.

The extending side-arms 514 and 516 each may be projections that extend away from the frame elements 504 and 506, respectively, and are positioned behind a wearer's ears to secure the head-mountable device 502. The extending side-arms 514 and 516 may further secure the head-mountable device 502 to the wearer by extending around a rear portion of the wearer's head. Additionally or alternatively, for example, head-mountable device 502 may connect to or be affixed within a head-mounted helmet structure. Other possibilities exist as well.

Head-mountable device 502 may also include an on-board computing system 518, video camera 520, sensor 522, and finger-operable touchpads 524, 526. The on-board computing system 518 is shown on the extending side-arm 514 of the head-mountable device 502; however, the on-board computing system 518 may be positioned on other parts of the head-mountable device 502 or may be remote from head-mountable device 502; e.g., the on-board computing system 518 could be wired to or wirelessly-connected to the head-mounted device 502.

The on-board computing system 518 may include a processor and memory, for example. The on-board computing system 518 may be configured to receive and analyze data from video camera 520, sensor 522, and the finger-operable touchpads 524, 526 (and possibly from other sensory devices, user interfaces, or both) and generate images for output from the lens elements 510 and 512 and/or other devices.

The sensor 522 is shown mounted on the extending side-arm 516 of the head-mountable device 502; however, the sensor 522 may be provided on other parts of the head-mountable device 502. The sensor 522 may include one or more of a gyroscope or an accelerometer, for example. Other sensing devices may be included within the sensor 522 or other sensing functions may be performed by the sensor 522.

In an example embodiment, sensors such as sensor 522 may be configured to detect head movement by a wearer of head-mountable device 502. For instance, a gyroscope and/or accelerometer may be arranged to detect head movements, and may be configured to output head-movement data. This head-movement data may then be used to carry out functions of an example method, such as method 100, for instance.

The finger-operable touchpads 524, 526 are shown mounted on the extending side-arms 514, 516 of the head-mountable device 502. Each of finger-operable touchpads 524, 526 may be used by a wearer to input commands. The finger-operable touchpads 524, 526 may sense at least one of a position and a movement of a finger via capacitive sensing, resistance sensing, or a surface acoustic wave process, among other possibilities. The finger-operable touchpads 524, 526 may be capable of sensing finger movement in a direction parallel or planar to the pad surface, in a direction normal to the pad surface, or both, and may also be capable of sensing a level of pressure applied. The finger-operable touchpads 524, 526 may be formed of one or more transparent or transparent insulating layers and one or more transparent or transparent conducting layers. Edges of the finger-operable touchpads 524, 526 may be formed to have a raised, indented, or roughened surface, so as to provide tactile feedback to a wearer when the wearer's finger reaches the edge of the finger-operable touchpads 524, 526. Each of the finger-operable touchpads 524, 526 may be operated independently, and may provide a different function.

FIG. 5B illustrates an alternate view of the wearable computing device shown in FIG. 5A. As shown in FIG. 5B, the lens elements 510 and 512 may act as display elements. The head-mountable device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

The lens elements 510 and 512 may act as a combiner in a light projection system and may include a coating that reflects the light projected onto them from the projectors 528 and 532. In some embodiments, a special coating may not be used (e.g., when the projectors 528 and 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the wearer, or other optical elements capable of delivering an in focus near-to-eye image to the wearer. A corresponding display driver may be disposed within the frame elements 504 and 506 for driving such a matrix display. Alternatively or additionally, a laser or light-emitting diode (LED) source and scanning system could be used to draw a raster display directly onto the retina of one or more of the wearer's eyes. Other possibilities exist as well.

While FIGS. 5A and 5B show two touchpads and two display elements, it should be understood that many example methods and systems may be implemented in wearable computing devices with only one touchpad and/or with only one lens element having a display element. It is also possible that example methods and systems may be implemented in wearable computing devices with more than two touchpads.

The outward-facing video camera 520 is shown to be positioned on the extending side-arm 514 of the head-mountable device 502; however, the outward-facing video camera 520 may be provided on other parts of the head-mountable device 502. The outward-facing video camera 520 may be configured to capture images at various resolutions or at different frame rates. Many video cameras with a small form-factor, such as those used in cell phones or webcams, for example, may be incorporated into an example of wearable computing device 500.

Although FIG. 5A illustrates one outward-facing video camera 520, more outward-facing video cameras may be used than shown in FIG. 5A, and each outward-facing video camera may be configured to capture the same view, or to capture different views. For example, the outward-facing video camera 520 may be forward facing to capture at least a portion of the real-world view perceived by the wearer. This forward facing image captured by the outward-facing video camera 520 may then be used to generate an augmented reality where computer generated images appear to interact with the real-world view perceived by the wearer.

In some embodiments not shown in FIGS. 5A and 5B, wearable computing device 500 can also or instead include one or more inward-facing cameras. Each inward-facing camera can be configured to capture still images and/or video of part or all of the wearer's face. For example, the inward-facing camera can be configured to capture images of an eye of the wearer. Wearable computing device 500 may use other types of sensors to detect a wearer's eye movements, in addition to or in the alternative to an inward-facing camera. For example, wearable computing device 500 could incorporate a proximity sensor or sensors, which may be used to measure distance using infrared reflectance. In one such embodiment, lens element 510 and/or 512 could include a number of LEDs which are each co-located with an infrared receiver, to detect when a wearer looks at a particular LED. As such, eye movements between LED locations may be detected. Other examples are also possible.

Figure 6:
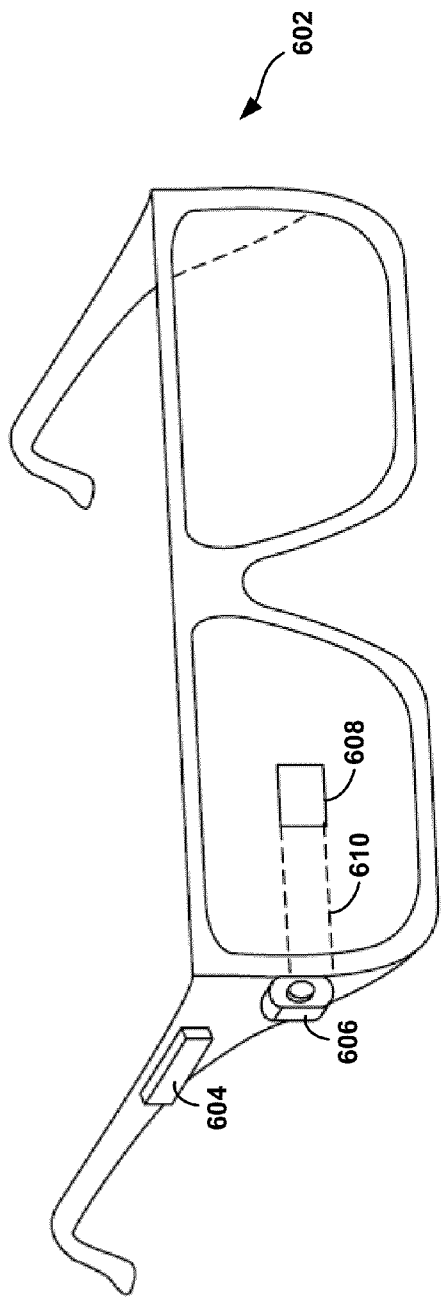
FIG. 6 illustrates another wearable computing device, according to an example embodiment.

FIG. 6 illustrates another wearable computing device, according to an example embodiment, which takes the form of head-mountable device 602. Head-mountable device 602 may include frame elements and side-arms, such as those described with respect to FIGS. 5A and 5B. Head-mountable device 602 may additionally include an on-board computing system 604 and video camera 606, such as described with respect to FIGS. 5A and 5B. Video camera 606 is shown mounted on a frame of head-mountable device 602. However, video camera 606 may be mounted at other positions as well.

As shown in FIG. 6, head-mountable device 602 may include display 608 which may be coupled to a wearable computing device. Display 608 may be formed on one of the lens elements of head-mountable device 602, such as a lens element described with respect to FIGS. 5A and 5B, and may be configured to overlay computer-generated graphics on the wearer's view of the physical world.

Display 608 is shown to be provided in a center of a lens of head-mountable device 602; however, the display 608 may be provided in other positions. The display 608 can be controlled using on-board computing system 604 coupled to display 608 via an optical waveguide 610.

Figure 7:
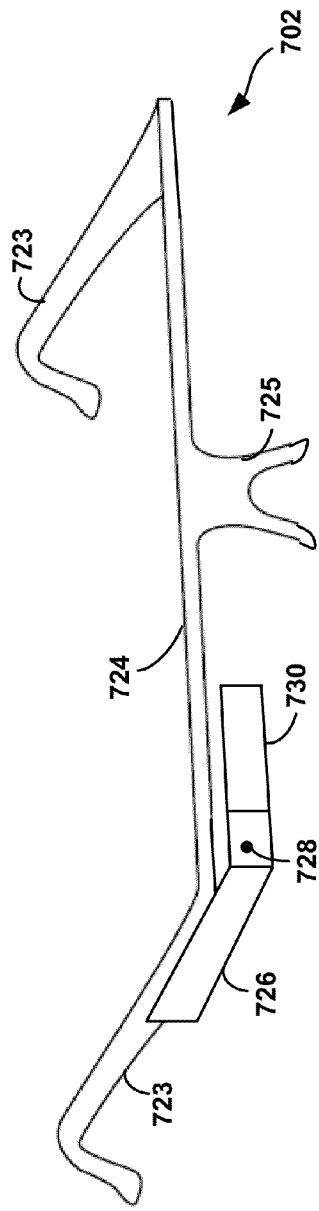
FIG. 7 illustrates yet another wearable computing device, according to an example embodiment.

FIG. 7 illustrates yet another wearable computing device, according to an example embodiment, which takes the form of head-mountable device 702. Head-mountable device 702 can include side-arms 723, a center frame support 724, and a bridge portion with nosepiece 725. In the example shown in FIG. 7, the center frame support 724 connects the side-arms 723. As shown in FIG. 7, head-mountable device 702 does not include lens-frames containing lens elements. Head-mountable device 702 may additionally include an on-board computing system 726 and video camera 728, such as described with respect to FIGS. 5A and 5B.

Head-mountable device 702 may include a single lens element 730 configured to be coupled to one of the side-arms 723 and/or center frame support 724. The lens element 730 may include a display such as the display described with reference to FIGS. 5A and 5B, and may be configured to overlay computer-generated graphics upon the wearer's view of the physical world. In one example, the single lens element 730 may be coupled to the inner side (i.e., the side exposed to a portion of a wearer's head when worn by the wearer) of the extending side-arm 723. The single lens element 730 may be positioned in front of or proximate to a wearer's eye when head-mountable device 702 is worn. For example, the single lens element 730 may be positioned below the center frame support 724, as shown in FIG. 7.

Figure 8:
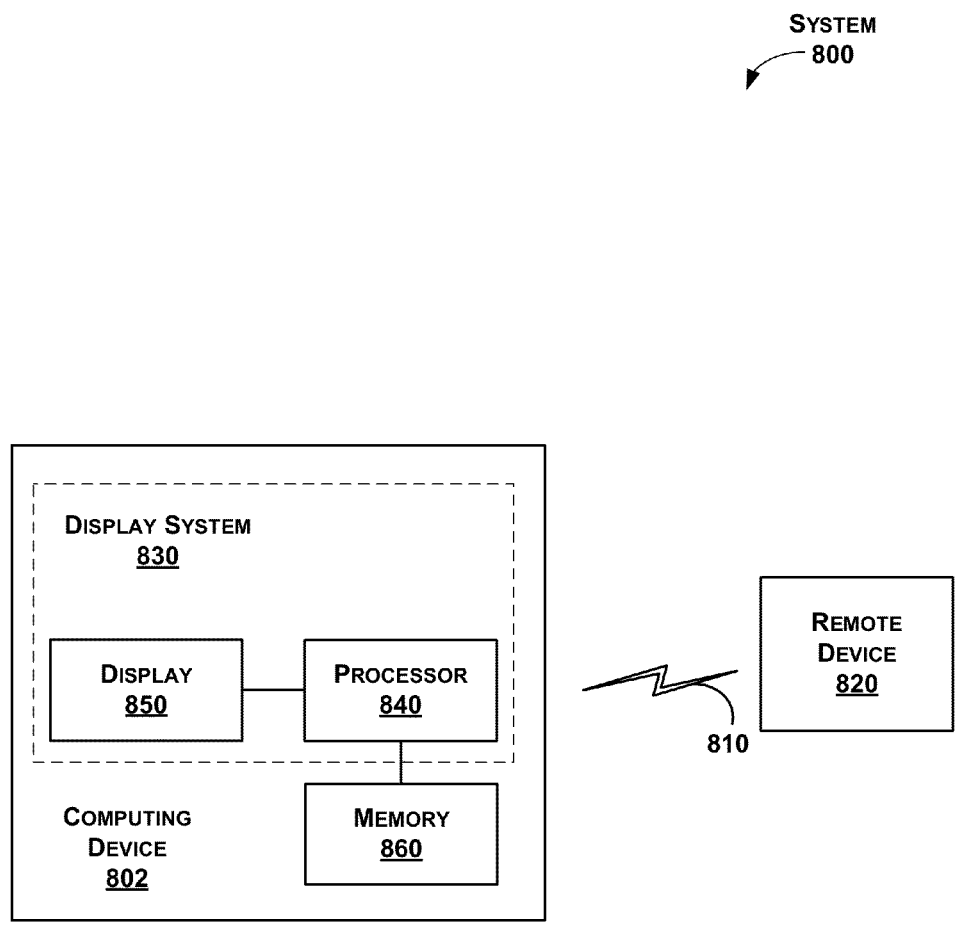
FIG. 8 illustrates an example schematic drawing of a computer network infrastructure in which an example embodiment may be implemented.

FIG. 8 illustrates a schematic drawing of a computing system 800 according to an example embodiment. In system 800, a computing device 802 communicates using a communication link 810 (e.g., a wired or wireless connection) to a remote device 820. Computing device 802 may be any type of device that can receive data and display information corresponding to or associated with the data. For example, the device 802 may be associated with and/or be part or all of a heads-up display system, such as the head-mounted devices 300, 330, 402, 502, 602, and/or 702 described with reference to FIGS. 3A-6.

Thus, computing device 802 may include display system 830 comprising processor 840 and a display 850. Display 850 may be, for example, an optical see-through display, an optical see-around display, or a video see-through display. Processor 840 may receive data from remote device 820 and configure the data for display on display 850. Processor 840 may be any type of processor, such as a micro-processor or a digital signal processor, for example.

Computing device 802 may further include on-board data storage, such as memory 860 coupled to the processor 840. Memory 860 may store software that can be accessed and executed by the processor 840. For example, memory 860 may store software that, if executed by processor 840 is configured to perform some or all of the functionality described herein, for example.

Remote device 820 may be any type of computing device or transmitter including a laptop computer, a mobile telephone, or tablet computing device, etc., that is configured to transmit and/or receive data to/from computing device 802. Remote device 820 and computing device 802 may contain hardware to establish, maintain, and tear down communication link 810, such as processors, transmitters, receivers, antennas, etc.

In FIG. 8, communication link 810 is illustrated as a wireless connection; however, communication link 810 can also or instead include wired connection(s). For example, the communication link 810 may include a wired serial bus such as a universal serial bus or a parallel bus. A wired connection may be a proprietary connection as well. The communication link 810 may also include a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. Computing device 802 and/or remote device 820 may be accessible via the Internet and may include a computing cluster associated with a particular web service (e.g., social-networking, photo sharing, address book, etc.).

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
   determining, by a head-mountable device (HMD), a measure of ambient light at each of one or more ambient light sensors (ALSs) arranged on the HMD, wherein each ALS is configured to measure ambient light corresponding to a respective location of one of a plurality of electromagnetic-radiation emitter/sensors (EESs) arranged on the HMD, and wherein ambient light comprises electromagnetic radiation other than electromagnetic radiation emitted by the plurality of EESs;
   based on the one or more determined measures of ambient light at the one or more ALSs, determining, by the HMD, (i) a first number of EESs to use for emitting electromagnetic radiation toward an eye and (ii) a second number of EESs to use for detecting electromagnetic radiation reflected from the eye;
   selecting, by the HMD from among the plurality of EESs, a first group of particular EESs based at least on the first group having the first number of EESs;
   selecting, by the HMD from among the plurality of EESs, a second group of particular EESs based at least on the second group having the second number of EESs;
   causing, by the HMD, each of the particular EESs of the first group to emit electromagnetic radiation toward the eye;
   receiving, by the HMD from the particular EESs of the second group, data indicative of electromagnetic radiation reflected from the eye; and
   determining, by the HMD, a position of a portion of the eye based on the received data.

2. The method of claim 1, further comprising:
   further based on the one or more determined measures of ambient light at the one or more ALSs, determining by the HMD, for each of the particular EESs of the first group, respective electromagnetic radiation characteristics to use when emitting electromagnetic radiation toward the eye,
   wherein causing each of the particular EESs of the first group to emit electromagnetic radiation toward the eye comprises causing each of the particular EESs of the first group to emit toward the eye electromagnetic radiation having the determined respective electromagnetic radiation characteristics.

3. The method of claim 2, wherein the respective electromagnetic radiation characteristics comprise one or more of: (i) a power at which the electromagnetic radiation is emitted toward the eye, (ii) a duration for which the electromagnetic radiation is emitted toward the eye, and (iii) a frequency at which the electromagnetic radiation is emitted toward the eye.

4. The method of claim 1, wherein the portion of the eye comprises a pupil of the eye.

5. The method of claim 1, wherein selecting the first group comprises for each particular EES from among the plurality of EESs:
   (i) if the determined measure of ambient light at a particular ALS associated with the particular EES exceeds a threshold measure of ambient light, including the particular EES in the first group, and
   (ii) if the determined measure of ambient light at the particular ALS associated with the particular EES is below the threshold measure of ambient light, excluding the particular EES from the first group.

6. The method of claim 1, wherein selecting the second group comprises for each particular EES from among the plurality of EESs:
   (i) if the determined measure of ambient light at a particular ALS associated with the particular EES exceeds a threshold measure of ambient light, including the particular EES in the second group, and
   (ii) if the determined measure of ambient light at the particular ALS associated with the particular EES is below the threshold measure of ambient light, excluding the particular EES from the second group.

7. A head-mountable device (HMD), comprising:
   a processor;
   a plurality of electromagnetic-radiation emitter/sensors (EESs);
   one or more ambient light sensors (ALSs), wherein each ALS is configured to measure ambient light corresponding to a respective location of one of the plurality of EESs, and wherein ambient light comprises electromagnetic radiation other than electromagnetic radiation emitted by the plurality of EESs;
   a non-transitory computer-readable medium; and
   program instructions stored on the non-transitory computer-readable medium and executable by the processor to cause the HMD to perform functions comprising:
      determining a measure of ambient light at each of the one or more ALSs;
      based on the one or more determined measures of ambient light at the one or more ALSs, determining (i) a first number of EESs to use for emitting electromagnetic radiation toward an eye and (ii) a second number of EESs to use for detecting electromagnetic radiation reflected from the eye;
      selecting, from among the plurality EESs, a first group of particular EESs based at least on the first group having the first number of EESs;

selecting, from among the plurality of EESs, a second group of particular EESs based at least on the second group having the second number of EESs;

causing each of the particular EESs of the first group to emit electromagnetic radiation toward the eye;

receiving, from the particular EESs of the second group, data indicative of electromagnetic radiation reflected from the eye; and determining a position of a portion of the eye based on the received data.

8. The HMD of claim 7, the functions further comprising:

further based on the one or more determined measures of ambient light at the one or more ALSs, determine for each of the particular EESs of the first group, respective electromagnetic radiation characteristics to use when emitting electromagnetic radiation toward the eye, wherein causing each of the particular EESs of the first group to emit electromagnetic radiation toward the eye comprises causing each of the particular EESs of the first group to emit toward the eye electromagnetic radiation having the determined respective electromagnetic radiation characteristics.

9. The HMD of claim 8, wherein the respective electromagnetic radiation characteristics comprise one or more of: (i) a power at which the electromagnetic radiation is emitted toward the eye, (ii) a duration for which the electromagnetic radiation is emitted toward the eye, and (iii) a frequency at which the electromagnetic radiation is emitted toward the eye.

10. The HMD of claim 7, wherein selecting the first group comprises for each particular EES from among the plurality of EESs:

(i) if the determined measure of ambient light at a particular ALS associated with the particular EES exceeds a threshold measure of ambient light, including the particular EES in the first group, and (ii) if the determined measure of ambient light at the particular ALS associated with the particular EES is below the threshold measure of ambient light, excluding the particular EES from the first group.

11. The HMD of claim 7, wherein selecting the second group comprises for each particular EES from among the plurality of EESs:

(i) if the determined measure of ambient light at a particular ALS associated with the particular EES exceeds a threshold measure of ambient light, including the particular EES in the second group, and (ii) if the determined measure of ambient light at the particular ALS associated with the particular EES is below the threshold measure of ambient light, excluding the particular EES from the second group.

12. The HMD of claim 7, wherein the portion of the eye comprises a pupil of the eye.

13. An article of manufacture including a non-transitory computer-readable medium having instructions stored thereon that, if the instructions are executed by a head-mountable device (HMD), cause the HMD to perform functions comprising:

determining a measure of ambient light at each of one or more ambient light sensors (ALSs) arranged on the HMD, wherein each ALS is configured to measure ambient light corresponding to a respective location of one of a plurality of electromagnetic-radiation emitter/sensors (EESs), and wherein ambient light comprises electromagnetic radiation other than electromagnetic radiation emitted by the plurality of EESs;

based on the one or more determined measures of ambient light at the one or more ALSs, determining (i) a first number of EESs to use for emitting electromagnetic radiation toward an eye and (ii) a second number of EESs to use for detecting electromagnetic radiation reflected from the eye;

selecting, from among the plurality EESs, a first group of one or more particular EESs based at least on the first group having the first number of EESs;

selecting, from among the plurality of EESs, a second group of particular EESs based at least on the second group having the second number of EESs;

causing each of the particular EESs of the first group to emit electromagnetic radiation toward the eye;

receiving, from the particular EESs of the second group, data indicative of electromagnetic radiation reflected from the eye; and determining a position of a portion of the eye based on the received data.

14. The article of manufacture of claim 13, wherein the functions further comprise:

further based on the one or more determined measures of ambient light at the one or more ALSs, determining, for each of the particular EESs of the first group, respective electromagnetic radiation characteristics to use when emitting electromagnetic radiation toward the eye, wherein causing each of the particular EESs of the first group to emit electromagnetic radiation toward the eye comprises causing each of the particular EESs of the first group to emit toward the eye electromagnetic radiation having the determined respective electromagnetic radiation characteristics.

15. The article of manufacture of claim 14, wherein the respective electromagnetic radiation characteristics comprise one or more of: (i) a power at which the electromagnetic radiation is emitted toward the eye, (ii) a duration for which the electromagnetic radiation is emitted toward the eye, and (iii) a frequency at which the electromagnetic radiation is emitted toward the eye.

16. The article of manufacture of claim 13, wherein the portion of the eye comprises a pupil of the eye.

17. The article of manufacture of claim 13, wherein selecting the first group comprises for each particular EES from among the plurality of EESs:

(i) if the determined measure of ambient light at a particular ALS associated with the particular EES exceeds a threshold measure of ambient light, including the particular EES in the first group, and (ii) if the determined measure of ambient light at the particular ALS associated with the particular EES is below the threshold measure of ambient light, excluding the particular EES from the first group.

18. The article of manufacture of claim 13, wherein selecting the second group comprises for each particular EES from among the plurality of EESs:

(i) if the determined measure of ambient light at a particular ALS associated with the particular EES exceeds a threshold measure of ambient light, including the particular EES in the second group, and (ii) if the determined measure of ambient light at the particular ALS associated with the particular EES is below the threshold measure of ambient light, excluding the particular EES from the second group.

* * * * *